US012592491B2

(12) United States Patent
Meng et al.

(10) Patent No.: US 12,592,491 B2
(45) Date of Patent: Mar. 31, 2026

(54) SELF-DECOUPLING WIDEBAND ANTENNA SYSTEM AND TERMINAL DEVICE

(71) Applicant: Honor Device Co., Ltd., Shenzhen (CN)

(72) Inventors: Hang Meng, Shenzhen (CN); Chao Guo, Shenzhen (CN); Yufei Zhang, Shenzhen (CN); Xuan Zhai, Shenzhen (CN); Hao Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 188 days.

(21) Appl. No.: 18/579,020

(22) PCT Filed: Aug. 23, 2022

(86) PCT No.: PCT/CN2022/114301
§ 371 (c)(1),
(2) Date: Jan. 12, 2024

(87) PCT Pub. No.: WO2023/098162
PCT Pub. Date: Jun. 8, 2023

(65) Prior Publication Data

US 2024/0322439 A1 Sep. 26, 2024

(30) Foreign Application Priority Data

Nov. 30, 2021 (CN) ........................ 202111446807.4

(51) Int. Cl.
*H01Q 21/28* (2006.01)
*H01Q 5/378* (2015.01)
(Continued)

(52) U.S. Cl.
CPC ............... *H01Q 9/42* (2013.01); *H01Q 5/378* (2015.01); *H01Q 5/50* (2015.01); *H01Q 21/28* (2013.01)

(58) Field of Classification Search
CPC ............ H01Q 1/243; H01Q 5/35; H01Q 5/50; H01Q 5/328; H01Q 5/335; H01Q 5/378; H01Q 9/42; H01Q 21/28
See application file for complete search history.

(56) References Cited

U.S. PATENT DOCUMENTS 10,015,294 B2 7/2018 Lee et al.
2019/0044218 A1* 2/2019 Ye ........................... H01Q 5/50
(Continued)

FOREIGN PATENT DOCUMENTS

CN 109346833 A 2/2019
CN 111129768 A 5/2020
(Continued)

*Primary Examiner* — Tung X Le
(74) *Attorney, Agent, or Firm* — Conley Rose, P.C.

(57) ABSTRACT

A self-decoupling wideband antenna system and a terminal device, including: a first end of a first radiation stub that is connected to a first ground point, and the first radiation stub is further connected to a first feed point; a first end of a second radiation stub and a first end of a third radiation stub are connected to a second ground point, and a slot is provided between a second end of the second radiation stub and a second end of the first radiation stub. A distance between the second end of the second radiation stub and the second end of the first radiation stub is less than a distance between the first end of the second radiation stub and the second end of the first radiation stub.

20 Claims, 24 Drawing Sheets

(51) Int. Cl.
*H01Q 5/50* (2015.01)
*H01Q 9/42* (2006.01)

(56) References Cited

U.S. PATENT DOCUMENTS

| | | | | |
|---|---|---|---|---|
| 2020/0403296 | A1 | 12/2020 | Ilvonen et al. | |
| 2022/0037764 | A1* | 2/2022 | Hsu | H01Q 1/36 |
| 2023/0006336 | A1* | 1/2023 | Yang | H01Q 9/30 |
| 2023/0261370 | A1 | 8/2023 | Hu et al. | |
| 2023/0335922 | A1* | 10/2023 | Wang | H01Q 5/307 |
| 2023/0361467 | A1* | 11/2023 | Wu | H01Q 9/42 |
| 2024/0021998 | A1 | 1/2024 | Wang | |

FOREIGN PATENT DOCUMENTS

| | | | |
|---|---|---|---|
| CN | 112490626 | A | 3/2021 |
| CN | 112736432 | A | 4/2021 |
| CN | 112928456 | A | 6/2021 |
| CN | 113013593 | A | 6/2021 |
| CN | 113381184 | A | 9/2021 |
| CN | 113437520 | A | 9/2021 |
| CN | 114221127 | A | 3/2022 |
| EP | 3131156 | A1 | 2/2017 |
| EP | 4350887 | A1 | 10/2024 |
| WO | 2021052158 | A1 | 3/2021 |

* cited by examiner a b c a b

SELF-DECOUPLING WIDEBAND ANTENNA SYSTEM AND TERMINAL DEVICE

CROSS-REFERENCE TO RELATED APPLICATIONS

This is a U.S. National Stage of International Application No. PCT/CN2022/114301 filed on Aug. 23, 2022, which claims priority to Chinese Patent Application No. 202111446807.4, filed with the China National Intellectual Property Administration on Nov. 30, 2021, both of which are incorporated herein by reference in their entireties.

This application claims priority to Chinese Patent Application No. 202111446807.4, filed with the China National Intellectual Property Administration on Nov. 30, 2021 and entitled "SELF-DECOUPLING WIDEBAND ANTENNA SYSTEM AND TERMINAL DEVICE", which is incorporated herein by reference in its entirety.

TECHNICAL FIELD

This application relates to the field of electronic technologies, and in particular, to a self-decoupling wideband antenna system and a terminal device.

BACKGROUND

With the rapid development of electronic technologies, functions of a terminal device are becoming increasingly powerful. A same terminal device needs to be compatible with more standards and frequency bands to improve the competitiveness of the terminal device and meet user requirements to the maximum extent.

Wireless fidelity (wireless fidelity, Wi-Fi) is used as an example, and with the popularization of new generation Wi-Fi (5th Generation Wi-Fi, for example, 5G Wi-Fi) transmission technologies, the terminal device generally needs to be compatible with 2.4G, 5G, and 6G frequency bands. A signal of each frequency band requires an antenna that supports the frequency band. When a terminal device needs to be compatible with a plurality of frequency bands, a plurality of antennas need to be distributed on the same terminal device. In addition to ensuring efficiency, each antenna also needs to consider isolation from another antenna. Therefore, the terminal device often tries to increase a distance between antennas to improve isolation between the antennas. For example, the plurality of antennas are placed on different side edges of the terminal device.

However, due to a limited size of the terminal device, the increased distance between the antennas causes tight space layout of an entire machine.

SUMMARY

This application provides a self-decoupling wideband antenna and a terminal device, which can form a compact layout of a self-decoupling wideband antenna system with a wide operating frequency band, high isolation, a small size, easy layout, and a low electromagnetic radiation specific absorption ratio (specific absorption ratio, SAR for short) value.

According to a first aspect, a self-decoupling bandwidth antenna is provided, including: a first radiation stub, a second radiation stub, a third radiation stub, a first feed point, a second feed point, and a third feed point, where a first end of the first radiation stub is connected to a first ground point, and the first radiation stub is further connected to the first feed point: a first end of the second radiation stub and a first end of the third radiation stub are connected to a second ground point, and a slot is provided between a second end of the second radiation stub and a second end of the first radiation stub: a distance between the second end of the second radiation stub and the second end of the first radiation stub is less than a distance between the first end of the second radiation stub and the second end of the first radiation stub; and the second radiation stub is further connected to the second feed point, and a second end of the third radiation stub away from the second ground point is connected to the third feed point.

The arrangement of the second radiation stub can increase isolation between the first radiation stub and the third radiation stub to implement self-decoupling. In addition, while being used as a decoupling structure, the second radiation stub can not only be used as a single radiator, but also be used as a parasitic radiator of another radiation stub, allowing a plurality of antennas with different frequency band signals to share the radiation stub, thereby reducing a size of an antenna and facilitating a layout of an entire machine. In addition, a resonant state can be achieved under the excitation of a plurality of different frequency band signals, thereby supporting a wider operating frequency band and forming a compact layout of a self-decoupling wideband antenna system. In addition, compared with a single radiation stub, the use of a main radiation stub plus a parasitic radiation stub allows current distribution in the antenna system to be more dispersed, thereby reducing an SAR value.

In a possible implementation, the antenna system includes: a first antenna, a second antenna, and a third antenna, where the first antenna includes the first radiation stub, the parasitic second radiation stub, and the first feed point; the second antenna includes the second radiation stub and the second feed point; and the third antenna includes the third radiation stub, the parasitic second radiation stub, and the third feed point.

In a possible implementation, an operating frequency band of the first antenna is the same as an operating frequency band of the third antenna, and the operating frequency band of the first antenna is different from an operating frequency band of the second antenna.

The first antenna and the third antenna may receive and send signals in a same frequency band or signals in adjacent frequency bands. Therefore, the addition of the second radiation stub increases the isolation between the first radiation stub and the third radiation stub, which implements self-decoupling of the antenna system.

In a possible implementation, the first radiation stub and the second radiation stub are configured to excite a first resonant mode under an action of a first frequency band signal fed at the first feed point, and the first resonant mode is a resonant mode corresponding to a slot common mode current: the first radiation stub and the second radiation stub are further configured to excite a second resonant mode under an action of a second frequency band signal fed at the first feed point, and the second resonant mode is a resonant mode corresponding to a slot differential mode current: the second radiation stub is configured to excite a third resonant mode under an action of a third frequency band signal fed at the second feed point: the second radiation stub and the third radiation stub are configured to excite a fourth resonant mode under an action of the first frequency band signal fed at the third feed point, and the fourth resonant mode is a resonant mode corresponding to a line common mode current; and the second radiation stub and the third radiation stub are further configured to excite a fifth resonant mode under an action of the second frequency band signal fed at the third feed point, and the fifth resonant mode is a resonant mode corresponding to a line differential mode current.

In the foregoing state, the second radiation stub can be used as a parasitic radiation stub of the first radiation stub to extend the operating frequency band from the first frequency band signal to the first frequency band signal and the second frequency band signal, and the second radiation stub can also be used as a parasitic radiation stub of the third radiation stub to extend the operating frequency band from the first frequency band signal to the first frequency band signal and the second frequency band signal, to achieve a function of extending the operating frequency band. In addition, when the antenna system operates in a MIMO state, the arrangement of the second radiation stub can also increase the isolation between the first radiation stub and the third radiation stub to implement self-decoupling. In addition, while being used as a decoupling structure, the second radiation stub can also be used as a radiation stub alone to generate resonance in the third frequency band signal corresponding to the second feed point, and extend an operating frequency band of the entire antenna system to the third frequency band signal. Therefore, the antenna system can support three frequency band signals and can also implement self-decoupling, that is, when it is ensured that a wider operating frequency band is supported, the isolation between the radiation stubs is increased, the size of the antenna system is reduced, which facilitates a layout of the entire machine, and the compact layout of the self-decoupling wideband antenna system is formed. In addition, compared with a single radiation stub, the use of a parasitic radiation stub allows current distribution to be more dispersed, thereby reducing the SAR value.

In a possible implementation, the antenna system further includes a tuning circuit, where one end of the tuning circuit is connected to the second feed point on the second radiation stub, and an other end of the tuning circuit is grounded. The tuning circuit can be configured to tune signals of different frequencies, allowing the antenna system to reach a plurality of resonant states and allowing the antenna system to have a wider operating frequency band.

In a possible implementation, the tuned matching circuit is an inductor-capacitor LC filtering circuit. Signals of different frequencies can be flexibly tuned by using the LC filtering circuit, to allow the antenna system to reach a resonant state and ensure that performance of the antenna system meets a use requirement.

In a possible implementation, the first radiation stub is in a form of a loop antenna, the second radiation stub is in a form of an inverted F antenna (inverted f antenna, IFA), and the third radiation stub is in a form of a loop antenna.

In a possible implementation, the first radiation stub is in a form of an inverted f antenna, the second radiation stub is in a form of an inverted f antenna, and the third radiation stub is in a form of a loop antenna.

In a possible implementation, the antenna system is a mode decoration antenna (mode decor antenna, MDA) system. The antenna system in a form of the MDA antenna facilitates the integration of the antenna system and an entire machine structure, thereby reducing difficulty of mounting and maintenance.

In a possible implementation, the antenna system is a frame antenna system. The antenna system in a form of the frame antenna is exposed outside a terminal device, which can avoid signal shielding caused by structures such as a housing and improve performance of the antenna.

In a possible implementation, the first frequency band signal, the second frequency band signal, and the third frequency band signal are Wi-Fi signals. The antenna system may be decoupled through the arrangement of the second radiation stub to ensure the isolation between the first radiation stub and the third radiation stub when 5G Wi-Fi and 6G Wi-Fi operate and also support 2.4G Wi-Fi. Due to a shared radiation stub, a structure of the antenna system is compact, which forms a compact layout of a self-decoupling wideband Wi-Fi antenna system, and reduces an SAR value of Wi-Fi.

According to a second aspect, a terminal device is provided, including any one of the antenna systems in the technical solution described in the first aspect.

In a possible implementation, the antenna system is located on a long side of the terminal device. Arranging the antenna system on a short side can prevent antenna efficiency from drastically decreasing due to hand holding when a user holds the terminal device during a call, ensuring communication quality when the user has a call.

In a possible implementation, the antenna system is located on a short side of the terminal device. Arranging the antenna system on a long side prevents antenna efficiency from drastically decreasing due to hand holding when a user watches videos or plays games horizontally, ensuring communication quality when the user holds the device horizontally.

DESCRIPTION OF EMBODIMENTS

Technical solutions in the embodiments of this application are described below with reference to the accompanying drawings in the embodiments of this application. In the descriptions of the embodiments of this application, "/" represents "or" unless otherwise specified. For example, A/B may represent A or B. The term "and/or" in this specification describes only an association relationship for describing associated objects and represents that three relationships may exist. For example, A and/or B may represent the following three cases: the following three cases: Only A exists, both A and B exist, and only B exists. In addition, in the descriptions of the embodiments of this application, "a plurality of" refers to two or more.

The terms "first", "second", and "third" mentioned below are merely intended for a purpose of description, and shall not be understood as an indication or implication of relative importance or implicit indication of the quantity of indicated technical features. Therefore, features defining "first", "second", and "third" may explicitly or implicitly include one or more such features.

The self-decoupling wideband antenna system provided in the embodiments of this application is applicable to a terminal device such as a mobile phone, a tablet computer, a wearable device, an in-vehicle device, an augmented reality (augmented reality, AR) device/virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in the embodiments of this application.

Figure 1:
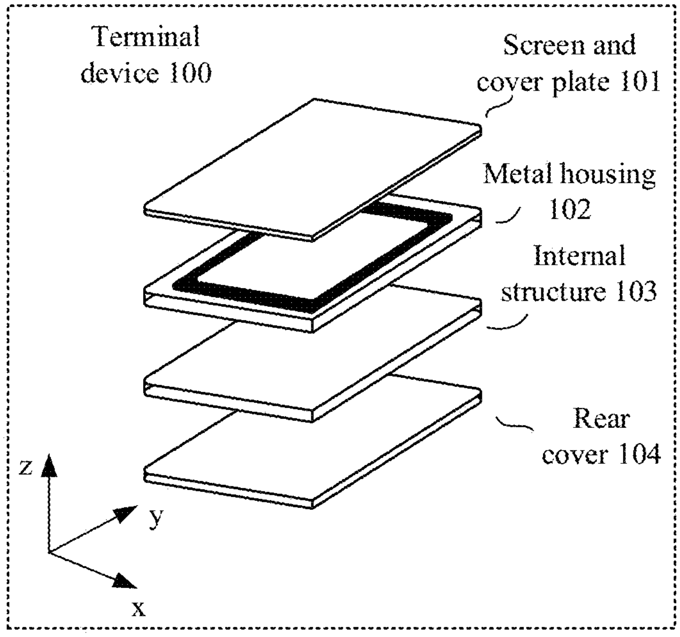
FIG. 1 is an example of a schematic structural diagram of a terminal device 100 and a schematic diagram of a position of an antenna system in the terminal device 100 according to an embodiment of this application.
Figure 1:
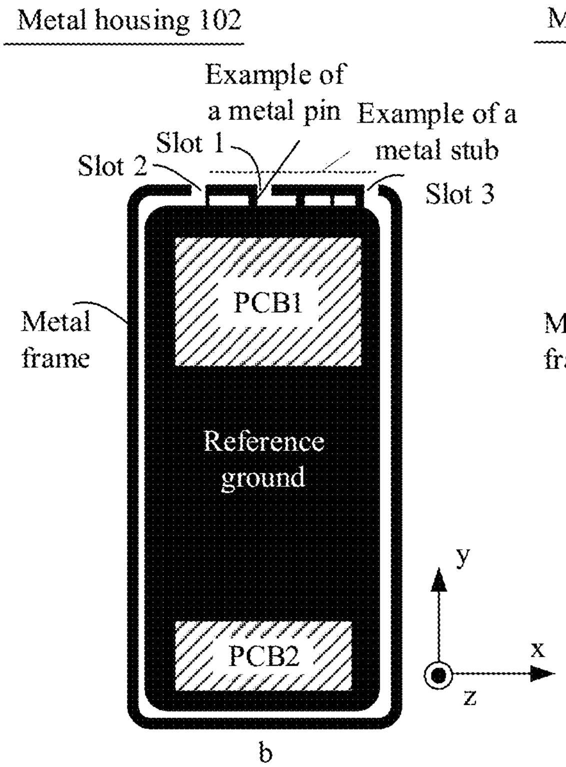
Figure 1:
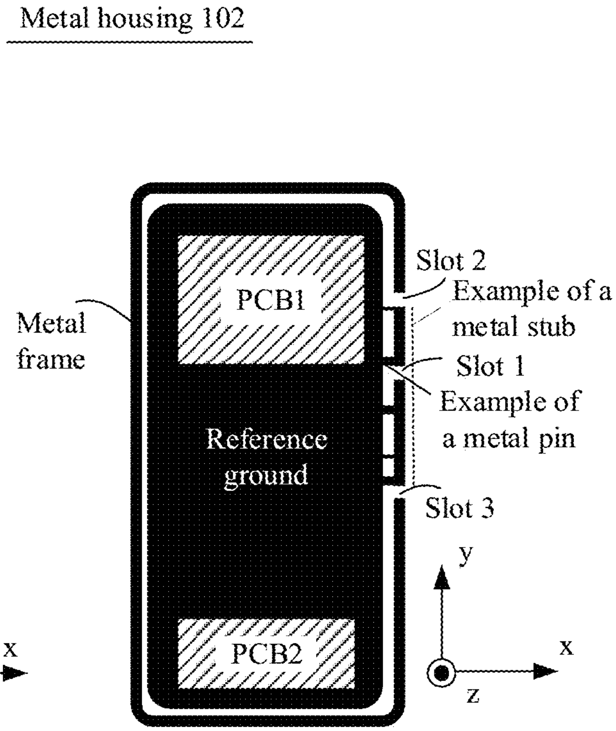

FIG. 1 is a schematic structural diagram of a terminal device 100 according to an embodiment of this application. As shown in a figure a in FIG. 1, the terminal device 100 provided in this embodiment of this application may be provided with a screen and cover plate 101, a metal housing 102, an internal structure 103, and a rear cover 104 in sequence along a z-axis from top to bottom.

The screen and cover plate 101 may be configured to implement a display function of the terminal device 100. The metal housing 102 may be used as a main framework of the terminal device 100 to provide rigid support for the terminal device 100. The internal structure 103 may include a collection of electronic components and mechanical components that implement various functions of the terminal device 100. For example, the internal structure 103 may include a shielding case, a screw, a reinforcing rib, and the like. The rear cover 104 may be an exterior surface of the back of the terminal device 100. The rear cover 104 may be made of a glass material, a ceramic material, plastic, and the like in different implementations.

The antenna solution provided in this embodiment of this application can be applied to the terminal device 100 shown in a figure a in FIG. 1 to support a wireless communication function of the terminal device 100. In some embodiments, an antenna system involved in the antenna solution may be arranged on the metal housing 102 of the terminal device 100. In some other embodiments, the antenna system involved in the antenna solution may be arranged on the rear cover 104 of the terminal device 100, or the like.

As an example, taking the metal housing 102 having a metal frame structure as an example, b and c in FIG. 1 show a schematic composition of the metal housing 102. A figure b in FIG. 1 shows an example in which the antenna system is arranged on a short side of the terminal device, and a figure c in FIG. 1 shows an example in which the antenna system is arranged on a long side of the terminal device. The figure b in FIG. 1 is used as an example for description, and the metal housing 102 may be made of a metal material such as aluminum alloy. As shown in the figure b in FIG. 1, a reference ground may be arranged on the metal housing 102. The reference ground may be a metal material with a large area, and is configured to provide most of the rigid support and also provide a zero potential reference for the electronic components. In the example shown in the figure b in FIG. 1, a metal frame may further be arranged on a periphery of the reference ground. The metal frame may be a complete and closed metal frame, and the metal frame may include metal bars, where some or all of the metal bars are suspended. In some other implementations, the metal frame may alternatively be a metal frame interrupted by one or more slots as shown in the figure b in FIG. 1. For example, in the example of the figure b in FIG. 1, a slot 1, a slot 2, and a slot 3 may be provided at different positions of the metal frame. These slots may interrupt the metal frame to obtain independent metal stubs. In some other embodiments, some or all of these metal stubs may be used as radiation stubs of the antenna, thereby implementing structural reuse in a process of arranging the antenna, and reducing difficulty of arranging the antenna. When the metal stub is used as the radiation stub of the antenna, positions of the slots provided corresponding to one or two ends of the metal stub may be flexibly selected according to the arrangement of the antenna.

In the example shown in the figure b in FIG. 1, one or more metal pins may further be arranged on the metal frame. In some examples, a screw hole may be provided on the metal pin, to fasten another structural component by using a screw: In some other examples, the metal pin may be coupled to a feed point, so that when a metal stub connected to the metal pin is used as the radiation stub of the antenna, the antenna is fed through the metal pin. In some other examples, the metal pin may alternatively be coupled to another electronic component to implement a corresponding electrical connection function. In this embodiments of this application, in the figure b and the figure c in FIG. 1, the metal pin may be coupled to the feed point or may be grounded.

In this example, an illustration of arrangement of a printed circuit board (printed circuit board, PCB) on the metal housing is further shown. That a main board (main board) and a sub board (sub board) are separately designed is used as an example. In some other examples, the main board and the sub board may alternatively be connected, for example, an L-shaped PCB design. In some embodiments of this application, the main board (for example, a PCB1) may be configured to carry electronic components that implement various functions of the terminal device 100. For example, a processor, a memory, and a radio frequency module. The sub board (for example, a PCB2) may further be configured to carry electronic components. For example, a universal serial bus (Universal Serial Bus, USB) interface and related circuits, and a speak box. For another example, the sub board may further be configured to carry a radio frequency circuit or the like corresponding to an antenna arranged at the bottom (that is, a part in a negative direction of a y-axis of the terminal device).

All the antenna solutions provided in this embodiment of this application can be applied to the terminal device shown in the figure a in FIG. 1.

For ease of understanding, in the following embodiments of this application, a terminal device having the structure shown in FIG. 1 is used as an example to specifically describe a self-decoupling wideband antenna system provided in this embodiment of this application with reference to the accompanying drawings and application scenarios.

Figure 2:
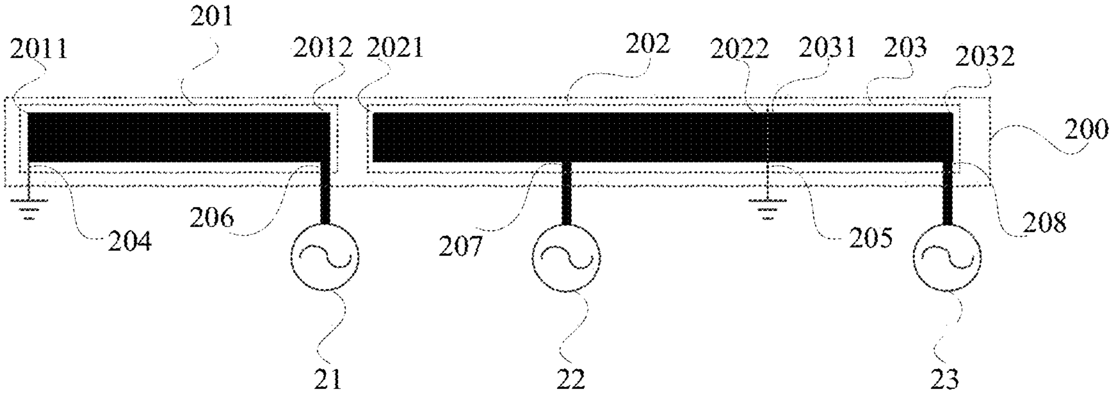
FIG. 2 is an example of a schematic structural diagram of a self-decoupling wideband antenna system according to an embodiment of this application.

FIG. 2 is an example of a schematic structural diagram of a self-decoupling wideband antenna system according to an embodiment of this application. The antenna system includes: a first radiation stub 201, a second radiation stub 202, a third radiation stub 203, a first feed point 206, a second feed point 207, and a third feed point 208. Specifically, a first end 2011 of the first radiation stub 201 is connected to a first ground point 204, and the first radiation stub 201 is further connected to the first feed point 206. A first end 2022 of the second radiation stub 202 and a first end 2031 of the third radiation stub 203 are connected to a second ground point 205, and a distance between a second end 2021 of the second radiation stub 202 and a second end 2012 of the first radiation stub 201 is relatively close and a slot is provided between the second end 2021 of the second radiation stub 202 and the second end 2012 of the first radiation stub 201, but the second end 2021 of the second radiation stub 202 and the second end 2012 of the first radiation stub 201 are not connected. The distance between the second end 2021 of the second radiation stub 202 and the second end 2012 of the first radiation stub 201 is less than a distance between the first end 2022 of the second radiation stub 202 and the second end 2012 of the first radiation stub 201. The second radiation stub 202 is connected to the second feed point 207, and a second end 2032 of the third radiation stub 203 away from the second ground point 205 is connected to the third feed point 208.

Optionally, the first feed point 206 may be directly connected to a first radiation source 21, the second feed point 207 may be directly connected to a second radiation source 22, and the third feed point 208 may be directly connected to a third radiation source 23. The first radiation source 21, the second radiation source 22, and the third radiation source 23 may respectively represent three radio frequency paths. The first radiation source 21 is used as an example. In a transmission state, the first radiation source 21 may represent a transmission path and transmit a transmit signal to the first feed point 206; and in a receiving state, the first radiation source 21 represents a radio frequency path to which a receiving signal flows and is not configured to generate a transmit signal.

Optionally, the first radiation stub 201, the second radiation stub 202, and the first feed point 206 may be used as a first antenna. A slot is provided between the two radiation stubs in the first antenna to form a slot antenna. The first feed point 206 is used as a port (which is denoted as Port1), the first antenna reaches a resonant state under the excitation of a signal. Current distribution forms at different resonant frequencies may be in forms of a slot common mode (C mode) current and a slot differential mode (D mode) current respectively, that is, electrical coupling parasitic is generated to excite a slot C mode/D mode. Compared with a situation in which the single first radiation stub 201 generates a common mode current, there is an additional excitation mode of a differential mode current and an additional resonant state of a frequency signal, thereby extending a use bandwidth of the antenna. The second radiation stub 202, the third radiation stub 203, and the third feed point 208 may be used as a third antenna, and the two radiation stubs in the third antenna are connected. The third feed point 208 is used as a port (which is denoted as Port3), and the third antenna reaches a resonant state under the excitation of a signal. Current distribution forms at different resonant frequencies may be in forms of a line common mode (C mode) current and a line differential mode (D mode) current respectively; that is, electrical coupling parasitic is generated to excite a line C mode/D mode. Compared with a situation in which the single third radiation stub 203 generates a common mode current, there is an additional excitation mode of a differential mode current and an additional resonant state of a frequency signal, thereby extending the use bandwidth. The second radiation stub 202 may also be used as a second antenna alone. The second feed point 207 is used as a port (which is denoted as Port2), and the second antenna reaches a resonant state under the excitation of a signal. It can be learned that the antenna system shown in FIG. 2 can support resonant states of a plurality of frequencies, which extends the use bandwidth. In addition, the foregoing three antennas can share the radiation stub, which reduces a size of the antenna.

Optionally; the first antenna, the second antenna, and the third antenna may alternatively be respectively used as separate antennas, and reach resonant states under the excitation of signals fed at three feed points. The use of three frequency bands may be supported, which expands the use bandwidth. Standards of the signals of the three frequency bands are not limited herein.

Figure 3:
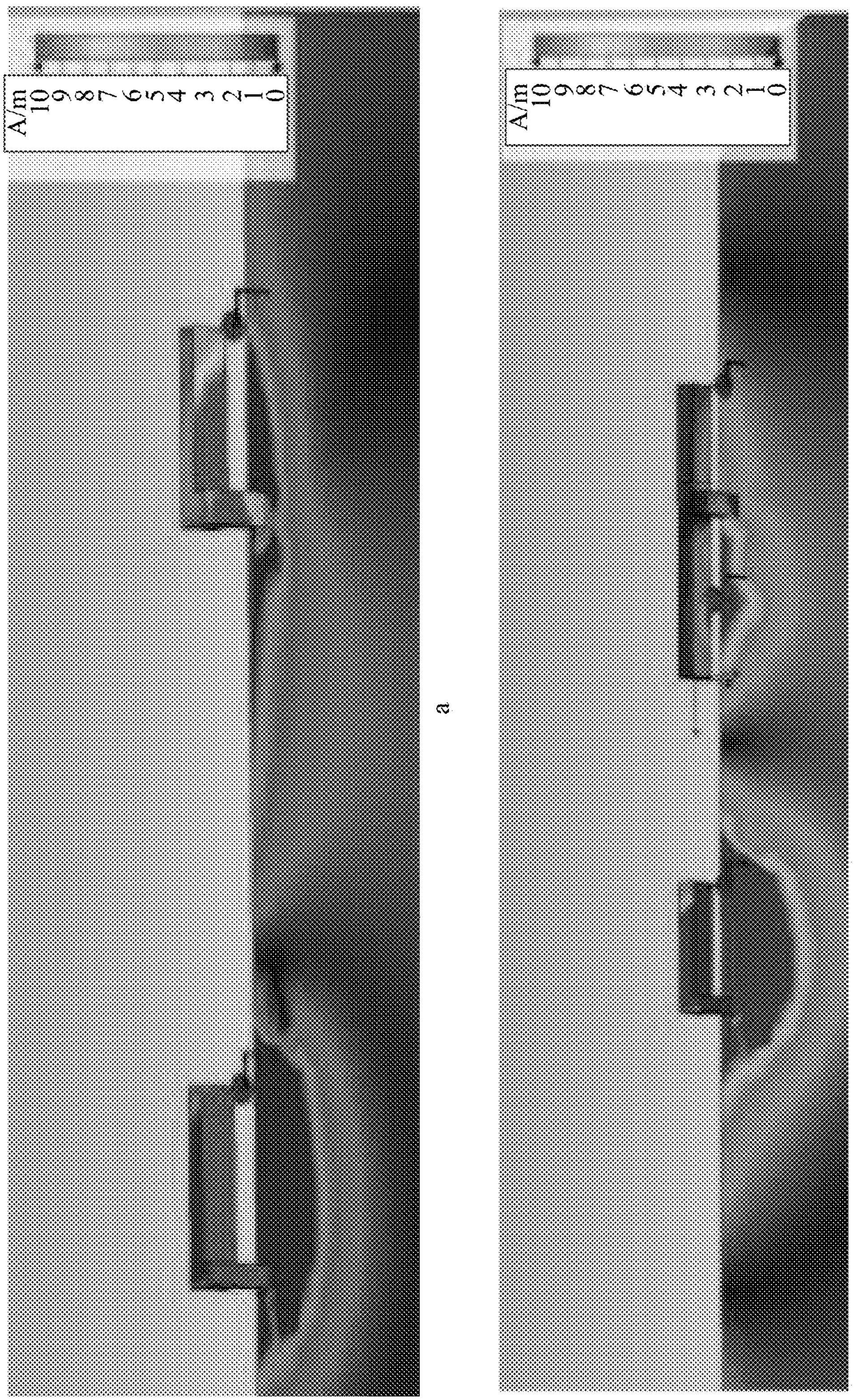
FIG. 3 is a schematic diagram of electric field distribution before and after a second radiation stub is added according to an embodiment of this application.

In addition, when the first antenna and the second antenna are used as MIMO antennas, the first antenna and the second antenna may send and receive signal in a same frequency band, and signal coupling may occur between the first radiation stub 201 and the third radiation stub 203, resulting in low isolation. The second radiation stub 202 can be used as a decoupling structure between the first radiation stub 201 and the third radiation stub 203 to implement self-decoupling of the antenna system, thereby improving isolation between the first radiation stub 201 and the third radiation stub 203. For details, reference may be made to a schematic diagram of electric field distribution shown in FIG. 3. A figure a in FIG. 3 is a schematic diagram of electric field distribution of a left radiation stub in an excited state when there is no decoupling structure between left and right radiation stubs. It can be learned from the figure a in FIG. 3 that there is a relatively larger electric field response on a floor below a right radiation stub, that is, the right radiation stub is greatly affected by a left radiation stub. A figure b in FIG. 3 is a schematic diagram of electric field distribution of a left radiation stub in an excited state when there is a decoupling structure between left and right radiation stubs. It can be learned from the figure b in FIG. 3 that there is a relatively small electric field response on a floor below a right radiation stub, that is, the right radiation stub is less affected by a left radiation stub. It can be learned that, adding a decoupling structure such as the second radiation stub 202, between the left and right radiation stubs can reduce coupling between the two radiation stubs, that is, improve isolation between the two radiation stubs.

In addition, the second radiation stub 202 may also send and receive signals as an antenna alone. Compared with arranging the second radiation stub 202 separately at another position, such arrangement implements self-decoupling and also reduces space occupied by the antenna system and reduces layout difficulty of an entire machine.

In the antenna system shown in FIG. 2, the arrangement of the second radiation stub 202 can increase the isolation between the first radiation stub 201 and the third radiation stub 203 to implement self-decoupling. In addition, while being used as a decoupling structure, the second radiation stub 202 can not only be used as a single radiator, but also be used as a parasitic radiator of another radiation stub, allowing a plurality of antennas with different frequency band signals to share the radiation stub, thereby reducing the size of the antenna and facilitating a layout of the entire machine. In addition, a resonant state can be achieved under the excitation of a plurality of different frequency band signals, so that the antenna system can support a wider operating frequency band and form a compact layout of a self-decoupling wideband antenna system. In addition, compared with a single radiation stub, the use of a main radiation stub plus a parasitic radiation stub allows current distribution to be more dispersed, thereby reducing an SAR value.

Figure 2A:
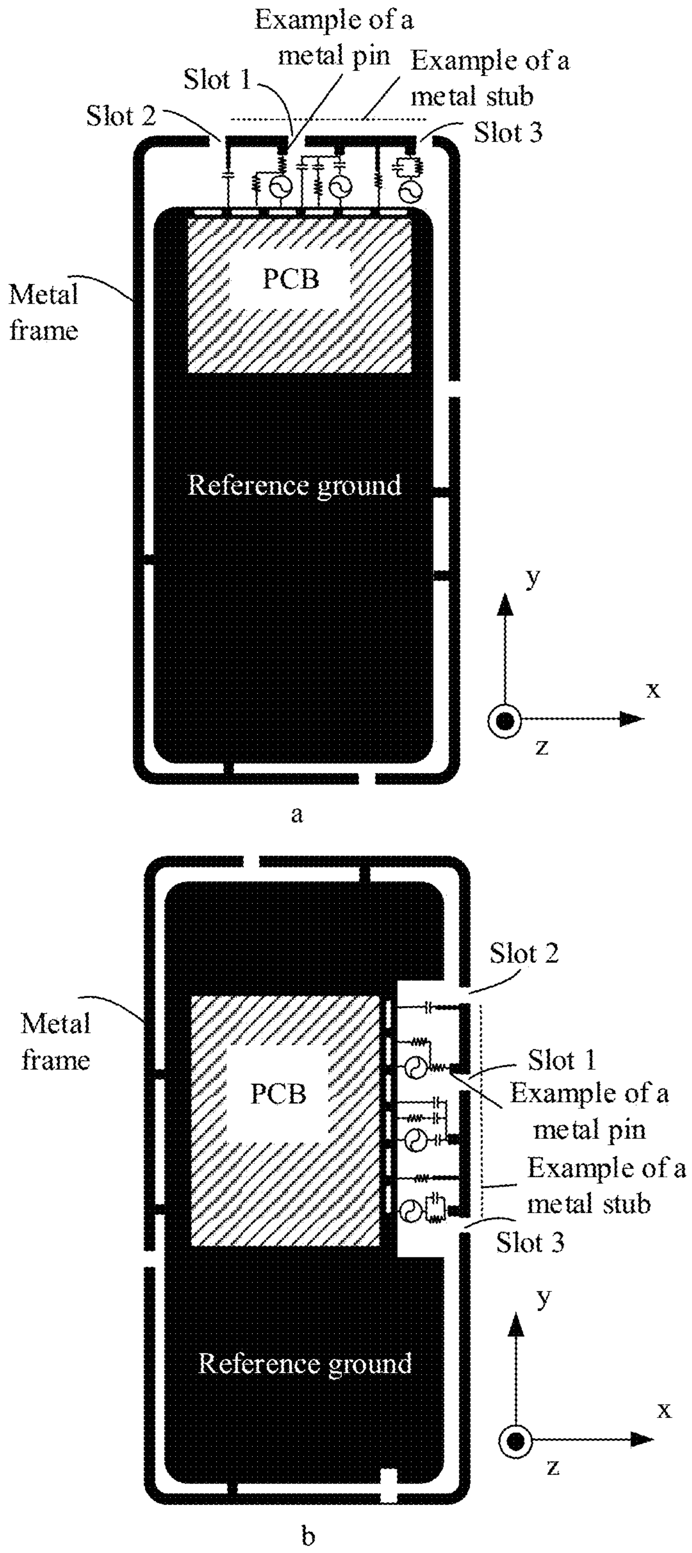
FIG. 2A is another example of a schematic diagram of a position of a self-decoupling wideband antenna system in a terminal device according to an embodiment of this application.

In some embodiments, the antenna system is arranged on a side edge of a terminal device, for example, arranged on a short side of the terminal device shown in a figure a in FIG. 2A, or arranged on a long side of the terminal device shown in a figure b in FIG. 2A.

Optionally, an operating frequency band of the first antenna is the same as an operating frequency band of the third antenna, and the operating frequency bands of the two antennas may be exactly the same: or the operating frequency bands of the two antennas are partially the same and partially different, that is, the operating frequency bands of the two antennas partially overlap. The operating frequency band of the first antenna is different from an operating frequency band of the second antenna, that is, the operating frequency band of the third antenna is different from the operating frequency band of the second antenna. The first antenna and the third antenna may receive and send signals in a same frequency band or signals in adjacent frequency bands. Therefore, the addition of the second radiation stub increases the isolation between the first radiation stub and the third radiation stub, which implements self-decoupling of the antenna system.

Based on the foregoing embodiments, the feed point of each radiation stub may be directly connected to the radiation source, or may be connected to the radiation source through a matching network. The ground point may be directly grounded or grounded through a matching network. The matching networks are configured to debug the resonant state of the antenna, for example, reference may be made to FIG. 4. In a schematic structural diagram of the antenna system shown in FIG. 4, the first radiation stub 201 is grounded through a matching circuit 401, and is connected to the first radiation source 21 through a matching circuit 402: the second radiation stub 202 is connected to the second radiation source 22 through a matching circuit 403, and is grounded through a matching circuit 404; and the third radiation stub 203 is connected to the third radiation source 23 through a matching circuit 405, and is grounded through the matching circuit 404. The foregoing matching circuit may use an LC filtering circuit. An inductor and a capacitor in the matching circuit may be debugged based on a specific circuit to determine a value. In some matching positions that do not need capacitors or inductors, a zero-ohm resistor may also be placed for debugging. Not all of the matching circuits 401 to 405 need to exist, but only any one or more matching circuits may be selected to reserve, as long as the antenna system can achieve a required resonant state, which is not limited in this embodiment of this application.

Figure 4:
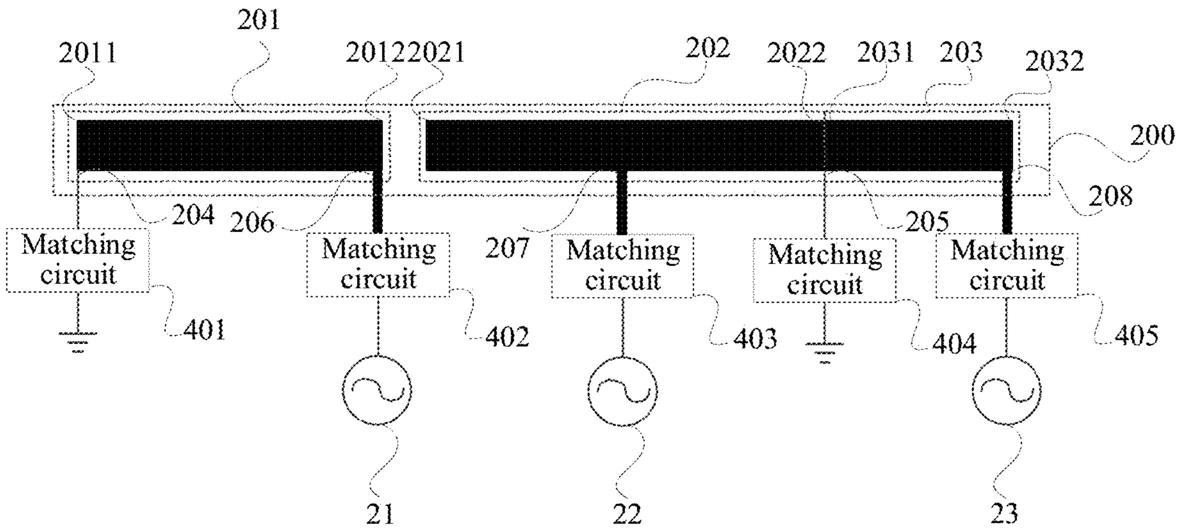
FIG. 4 is another example of a schematic structural diagram of a self-decoupling wideband antenna system according to an embodiment of this application.
Figure 5:
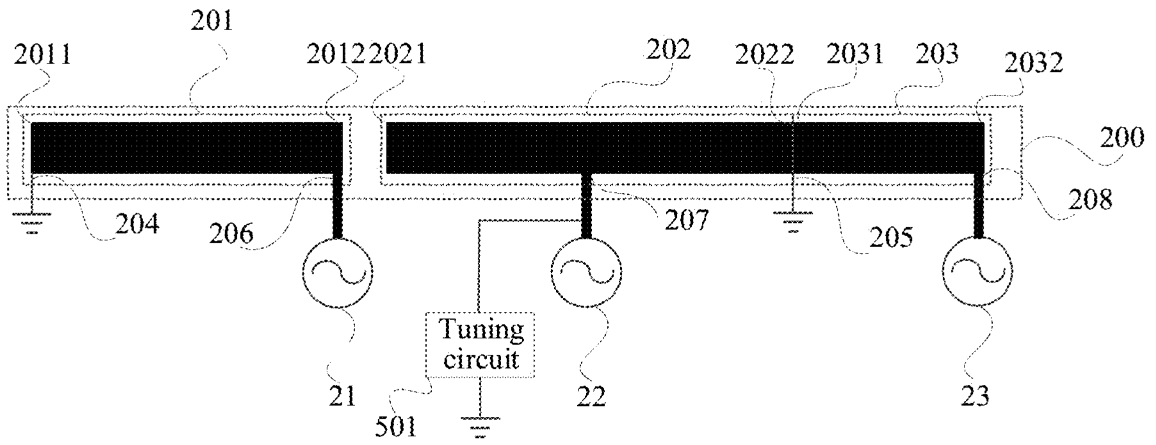
FIG. 5 is another example of a schematic structural diagram of a self-decoupling wideband antenna system according to an embodiment of this application.

Based on the foregoing embodiments, the antenna system may further include a tuning circuit 501 shown in FIG. 5, and FIG. 5 is an example based on the embodiment shown in FIG. 4. One end of the tuning circuit 501 is connected to the second feed point 207, and another end of the tuning circuit 501 is grounded. The tuning circuit 501 can be configured to tune signals of different frequencies, so that the antenna system reaches a plurality of resonant states, thereby allowing the antenna system to have a wider operating frequency band. Optionally, the tuning circuit may be in a form of a parallel capacitor-to-ground, or may be in a form of a parallel inductor-to-ground, or may be in a form of connecting a capacitor and an inductor in series and then being connected to ground in parallel. Optionally, the tuning circuit 501 is an inductor-capacitor (inductance-capacitor, LC) filtering circuit. Signals of different frequencies can be flexibly tuned by using the LC filtering circuit, to allow the antenna system to reach a resonant state and ensure that performance of the antenna system meets a use requirement.

Optionally, an operating state of the antenna system shown in the foregoing embodiments may also be as follows.

Figure 6:
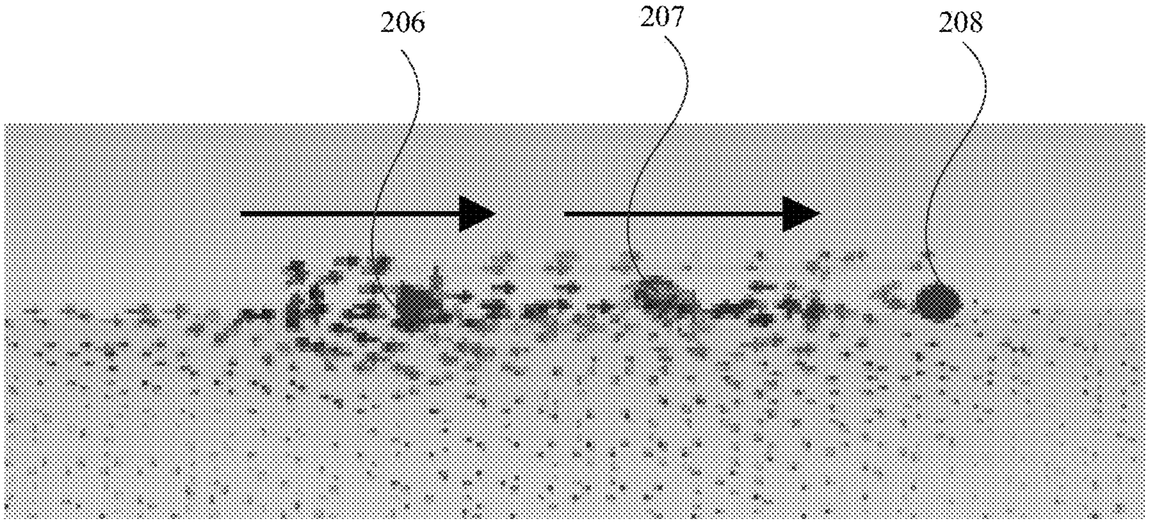
FIG. 6 is an example of a schematic diagram of distribution of a slot common mode current according to an embodiment of this application.

The first radiation stub 201 and the second radiation stub 202 are configured to excite a first resonant mode under an action of a first frequency band signal fed at the first feed point 206, and the first resonant mode is a resonant mode corresponding to a slot common mode current. Specifically, when the first frequency band signal fed at the first feed point 206 acts (including transmitting the first frequency band signal through the first feed point 206 or receiving the first frequency band signal through the first feed point 206), the first radiation stub 201 is used as a main radiation unit, and the second radiation stub 202 is used as a parasitic radiation unit. The two radiation stubs act together to excite the first resonant mode under the action of the first frequency band signal. In some embodiments, current distribution on the antenna system in a state of the first resonant mode may be shown in FIG. 6. Currents are densely distributed on the first radiation stub 201 and the second radiation stub 202, and flow directions of most of the currents are in a same direction from left to right, that is, in a distribution state of the slot common mode current.

Figure 7:
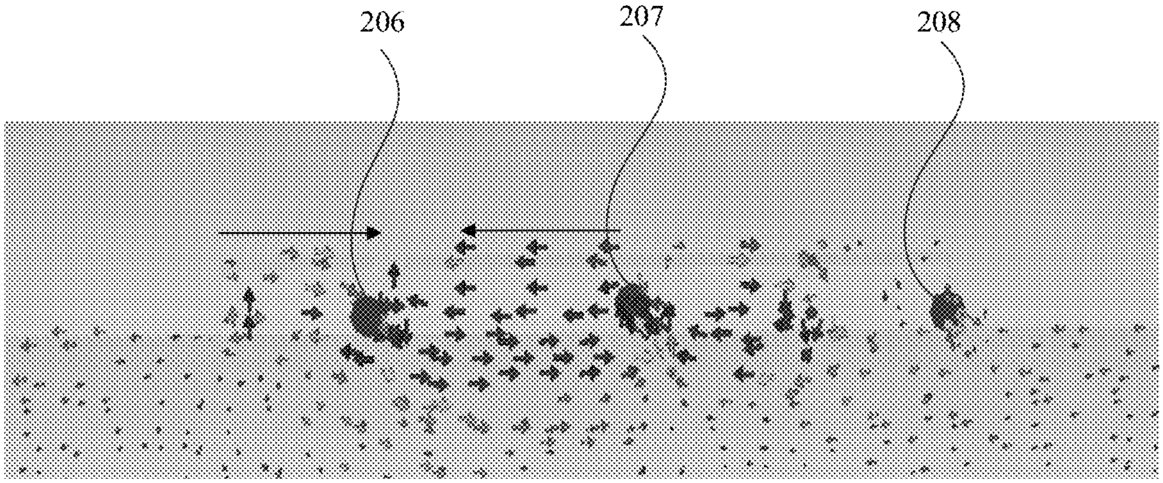
FIG. 7 is an example of a schematic diagram of distribution of a slot differential mode current according to an embodiment of this application.

The first radiation stub 201 and the second radiation stub 202 are further configured to excite a second resonant mode under an action of a second frequency band signal fed at the first feed point 206, and the second resonant mode is a resonant mode corresponding to a slot differential mode current. Specifically, when the second frequency band signal fed at the first feed point 206 acts (including transmitting the second frequency band signal through the first feed point 206 or receiving the second frequency band signal through the first feed point 206), the first radiation stub 201 is used as a main radiation unit, and the second radiation stub 202 is used as a parasitic radiation unit. The two radiation stubs act together to excite the second resonant mode under the action of the second frequency band signal. In some embodiments, current distribution on the antenna system in a state of the second resonant mode may be shown in FIG. 7. Currents are densely distributed on the first radiation stub 201 and the second radiation stub 202, and flow directions of the currents on the first radiation stub 201 and flow directions of the currents on the second radiation stub 203 are mostly opposite, that is, in a distribution state of the slot differential mode current.

Figure 8:
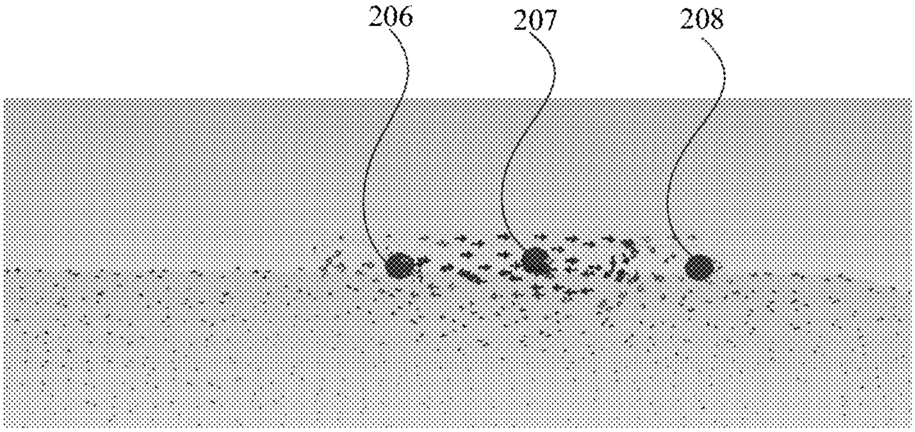
FIG. 8 is an example of a schematic diagram of current distribution when a second radiation stub separately radiates a signal according to an embodiment of this application.

The second radiation stub 202 is configured to excite a third resonant mode under an action of a third frequency band signal fed at the second feed point 207. Specifically; when the third frequency band signal fed at the second feed point 207 acts (including transmitting the third frequency band signal through the second feed point 207 or receiving the third frequency band signal through the second feed point 207), the second radiation stub 202 is used as a radiation unit and excites the third resonant mode under the action of the third frequency band signal. In some embodiments, current distribution on the antenna system in a state of the third resonant mode may be shown in FIG. 8. Currents are densely distributed on the second radiation stub 202.

Figure 9:
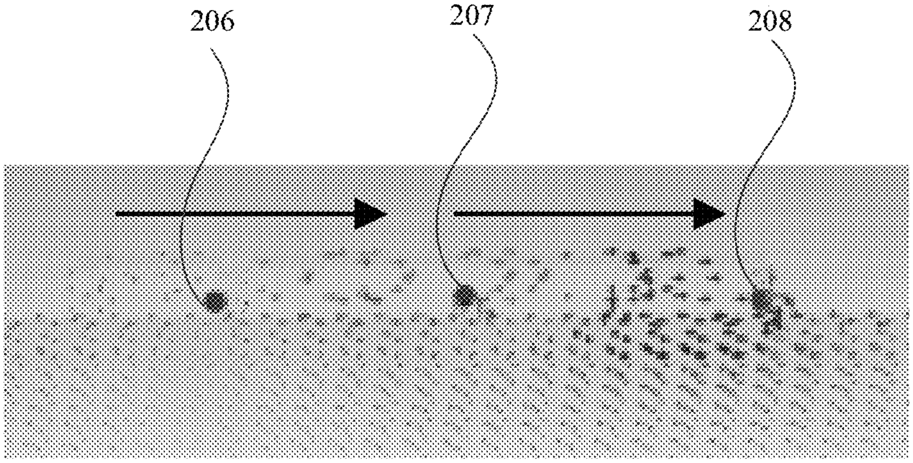
FIG. 9 is an example of a schematic diagram of distribution of a line common mode current according to an embodiment of this application.

The second radiation stub 202 and the third radiation stub 203 are configured to excite a fourth resonant mode under an action of the first frequency band signal fed at the third feed point 208, and the fourth resonant mode is a resonant mode corresponding to a line common mode current. Specifically, when the first frequency band signal fed at the third feed point 208 acts (including transmitting the first frequency band signal through the third feed point 208 or receiving the third frequency band signal through the first feed point 206), the third radiation stub 203 is used as a main radiation unit, and the second radiation stub 202 is used as a parasitic radiation unit. The two radiation stubs act together to excite the fourth resonant mode under the action of the first frequency band signal. In some embodiments, current distribution on the antenna system in a state of the fourth resonant mode may be shown in FIG. 9. Currents are densely distributed on the third radiation stub 203 and the second radiation stub 202, and flow directions of most of the currents are in a same direction from left to right, that is, in a distribution state of the line common mode current.

Figure 10:
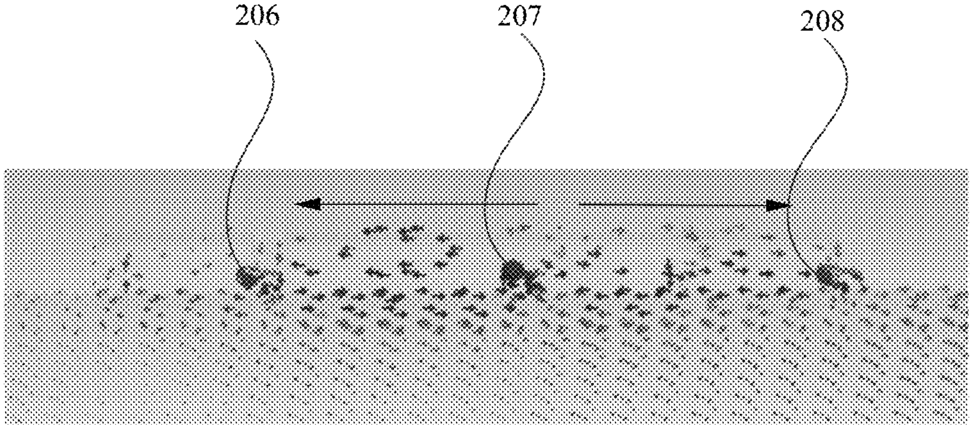
FIG. 10 is an example of a schematic diagram of distribution of a line differential mode current according to an embodiment of this application.

The second radiation stub 202 and the third radiation stub 203 are further configured to excite a fifth resonant mode under an action of the second frequency band signal fed at the third feed point 208, and the fifth resonant mode is a resonant mode corresponding to a line differential mode current. Specifically, when the second frequency band signal fed at the third feed point 208 acts (including transmitting the second frequency band signal through the third feed point 208 or receiving the second frequency band signal through the third feed point 208), the third radiation stub 203 is used as a main radiation unit, and the second radiation stub 202 is used as a parasitic radiation unit. The two radiation stubs act together to excite the fifth resonant mode under the action of the second frequency band signal. In some embodiments, current distribution on the antenna system in a state of the fifth resonant mode may be shown in FIG. 10. Currents are densely distributed on the third radiation stub 203 and the second radiation stub 202, and flow directions of the currents on the third radiation stub 203 and flow directions of the currents on the second radiation stub 202 are mostly opposite, that is, in a distribution state of the line differential mode current.

In the foregoing operating state, the second radiation stub 202 can be used as the parasitic radiation stub of the first radiation stub 201 to extend the operating frequency band from the first frequency band signal to the first frequency band signal and the second frequency band signal, and the second radiation stub 202 can also be used as the parasitic radiation stub of the third radiation stub 203 to extend the operating frequency band from the first frequency band signal to the first frequency band signal and the second frequency band signal, to achieve a function of extending the operating frequency band. In addition, when the antenna system operates in a MIMO state, the arrangement of the second radiation stub 202 can also increase the isolation between the first radiation stub 201 and the third radiation stub 203 to implement self-decoupling. In addition, while being used as a decoupling structure, the second radiation stub 202 can also be used as a radiation stub alone to generate resonance in the third frequency band signal corresponding to the second feed point 207, and extend an operating frequency band of the entire antenna system to the third frequency band signal. Therefore, the antenna system can support three frequency band signals and can also implement self-decoupling, that is, when it is ensured that a wider operating frequency band is supported, the isolation between the radiation stubs is increased, the size of the antenna is reduced, which facilitates the layout of the entire machine, and the compact layout of the self-decoupling wideband antenna is formed. In addition, compared with a single radiation stub, the use of a parasitic radiation stub allows current distribution to be more dispersed, thereby reducing the SAR value.

Optionally; the first frequency band signal and the second frequency band signal may be 5G Wi-Fi frequency band signals, and the third frequency band signal may be a 2.4G Wi-Fi frequency band signal. Optionally; the first frequency band signal may be a 5G Wi-Fi frequency band signal, and the second frequency band signal may be a 6G Wi-Fi frequency band signal (a Wi-Fi 6 or Wi-Fi 6E frequency band signal). For example, the first frequency band signal is a signal in a frequency band of which a central frequency is 5.5 GHZ, and the second frequency band signal is a signal in a frequency band of which a central frequency is 6.5 GHZ. A bandwidth of the frequency band may range from 200 MHz to 1 GHz, for example, may be 300 MHz, 700 MHz, or 800 MHZ, or other bandwidths, which are not limited herein. In this embodiment, the antenna may perform self-decoupling through the arrangement of the second radiation stub 202 to ensure the isolation between the first radiation stub 201 and the third radiation stub 203 when 5G Wi-Fi and 6G Wi-Fi operate. In addition, 2.4G Wi-Fi is supported. Due to a shared radiation stub, a structure of the antenna system is compact, which forms the compact layout of the self-decoupling wideband Wi-Fi antenna system and reduces the SAR value of Wi-Fi.

Figure 11:
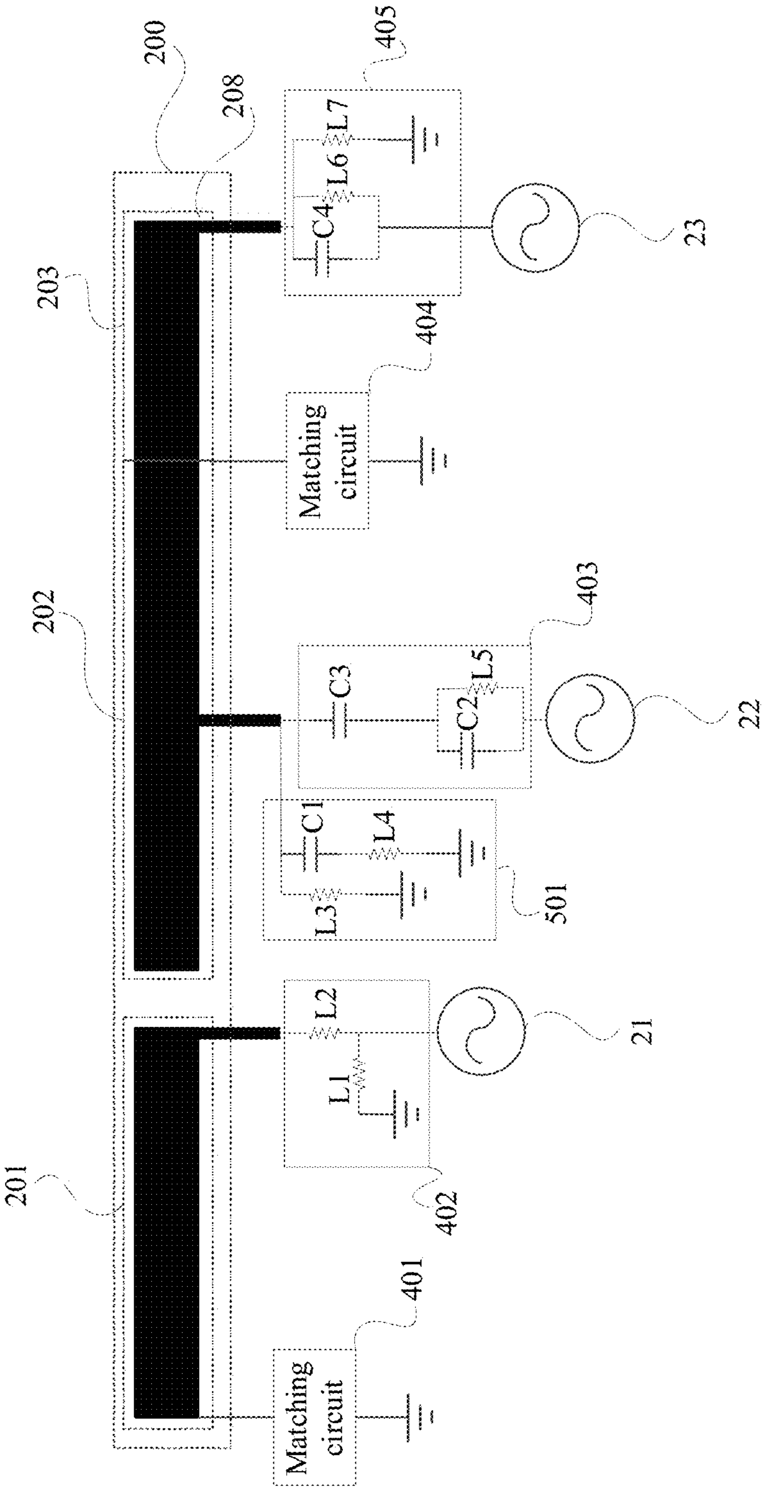
FIG. 11 is another example of a schematic structural diagram of a self-decoupling wideband antenna system according to an embodiment of this application.

In some embodiments, the structure of the antenna system may also be shown in FIG. 11. The circuit structure of the matching circuit 402, the matching circuit 403, the matching circuit 405, and the tuning circuit 501 is only an example and does not constitute a limitation on the embodiments of this application. The matching circuit may be the LC filtering circuit. L1, L2, L3, L4, L5, L6, and L7 are not limited to inductors and may also be capacitors or zero-ohm resistors. C1, C2, C3, and C4 are not limited to capacitors and may also be inductors or zero-ohm resistors. In an embodiment, the matching circuit 403 is configured to debug a resonant state of the second radiation stub 202 under the action of the third frequency band signal. The L3 can be configured to debug a 2.4G Wi-Fi signal. The C1 may be a 0.3 pF capacitor, and the L4 may be a 3 nH inductor to implement a resonant state with a passband of 6.3 GHZ. The C1 may also be a capacitor between 0.5 pF and 1.8 pF, and the L4 may also be an inductor between 1 nH and 10 nH, for example, a 3.3 nH inductor. Optionally, research and development personnel may debug the resonant state of the 2.4G Wi-Fi signal by debugging the matching circuit 403, and may also debug the resonant state of the 5G Wi-Fi signal by debugging the tuning circuit 501.

Figure 12:
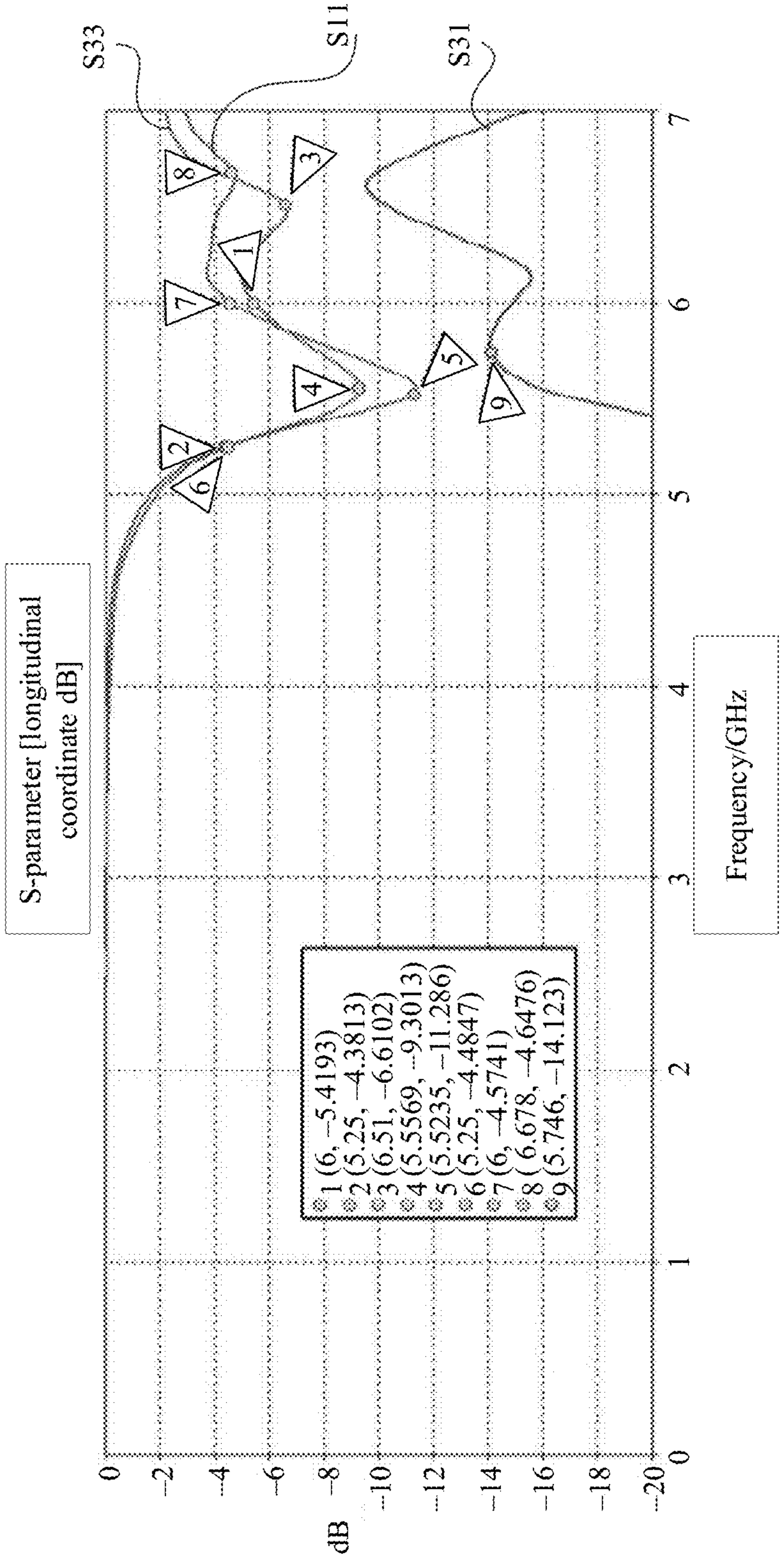
FIG. 12 is an example of a curve diagram of an S-parameter of an antenna system according to an embodiment of this application.

FIG. 12 is a curve diagram of an S-parameter of a port corresponding to a 5G Wi-Fi signal and a 6G Wi-Fi signal of an antenna according to an embodiment of this application. A horizontal axis represents frequency with a unit of GHz; and a longitudinal axis represents an S-parameter with a unit of dB. A curve S11 is a curve of a reflection coefficient of Port1, and mark points are 2, 4, 1, and 3 in order; and A curve S33 is a curve of a reflection coefficient of Port3, and mark points are 6, 5, 7, and 8 in order. Generally, it is considered that a smaller reflection coefficient indicates that less energy is lost and antenna efficiency is higher. On the contrary, a larger reflection coefficient indicates that more energy is lost, and efficiency of the antenna system is lower. It can be learned from FIG. 12 that for Port1, a signal of a frequency between the mark point 2 (5.25 GHZ) and the mark point 3 (6.51 GHZ) can reach a resonant state. A current distribution diagram corresponding to the mark point 4 may refer to FIG. 6, which is dominated by the slot common mode current; and a current distribution diagram corresponding to the mark point 3 may refer to FIG. 7, which is dominated by the slot differential mode current. For Port3, a signal of a frequency between the mark point 6 (5.25 GHZ) and the mark point 8 (6.68 GHz) can reach a resonant state. Isolation between Port1 and Port3 may refer to a curve S31. A mark point 9 on the curve S31 is isolation of a signal of 5.74 GHz, which is below −14 dB, and isolation of a signal around 6.6 GHz is also below −9.5 dB. A current distribution diagram corresponding to the mark point 5 may refer to FIG. 9, which is dominated by the line common mode current; and a current distribution diagram corresponding to the mark point 8 may refer to FIG. 10, which is dominated by the line differential mode current. FIG. 12 represents a wideband characteristic of the antenna. In addition, the addition of the second radiation stub 202 makes the isolation between Port1 and Port3 larger, which can meet a requirement.

To describe the wideband characteristic of the foregoing antenna system, a detailed description is provided below in a case of a single radiation stub and adding a parasitic radiation stub with reference to curve diagrams of an S-parameter and antenna efficiency.

Figure 13A:
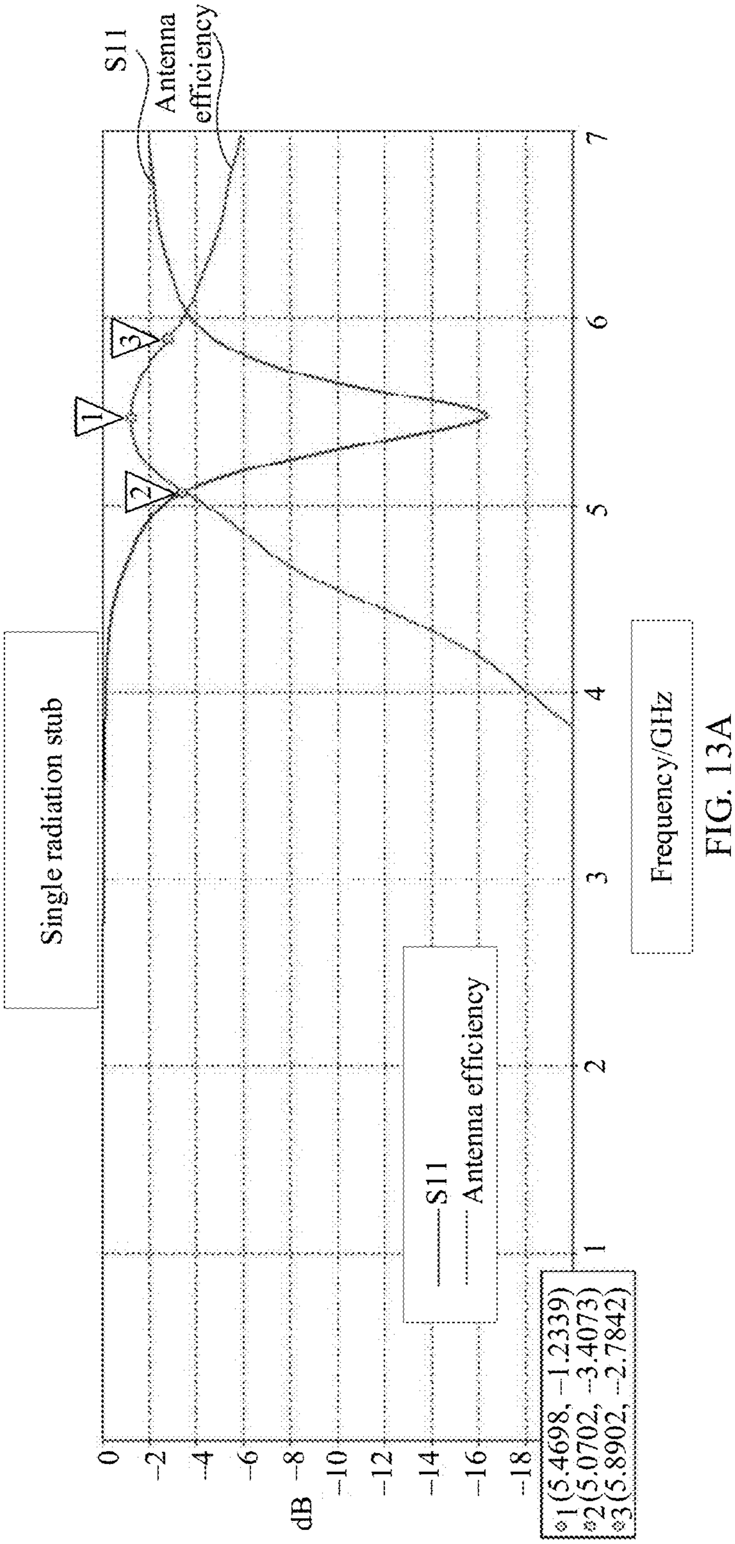
FIG. 13A and FIG. 13B are an example of a comparison diagram of S-parameter curves before and after a parasitic radiation stub is added according to an embodiment of this application.
Figure 13B:
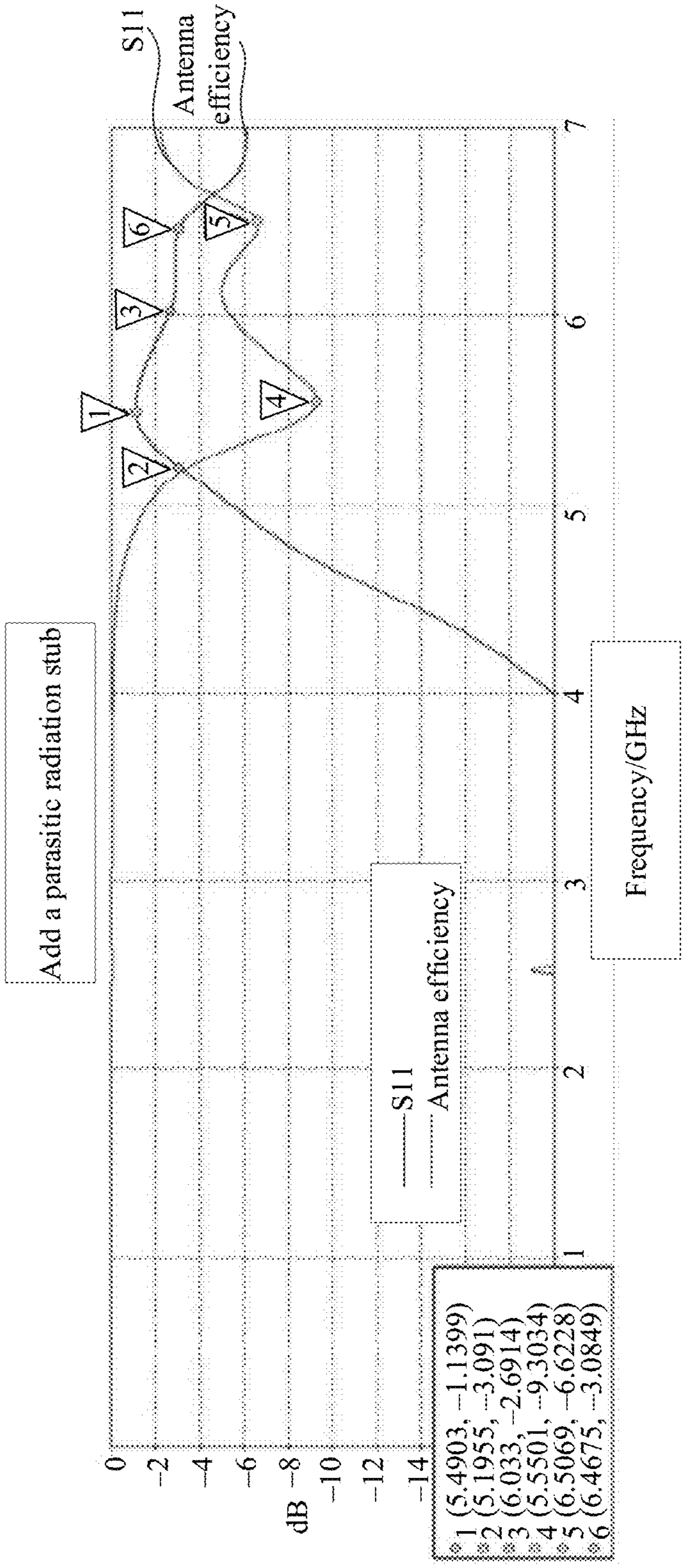
Figure 14A:
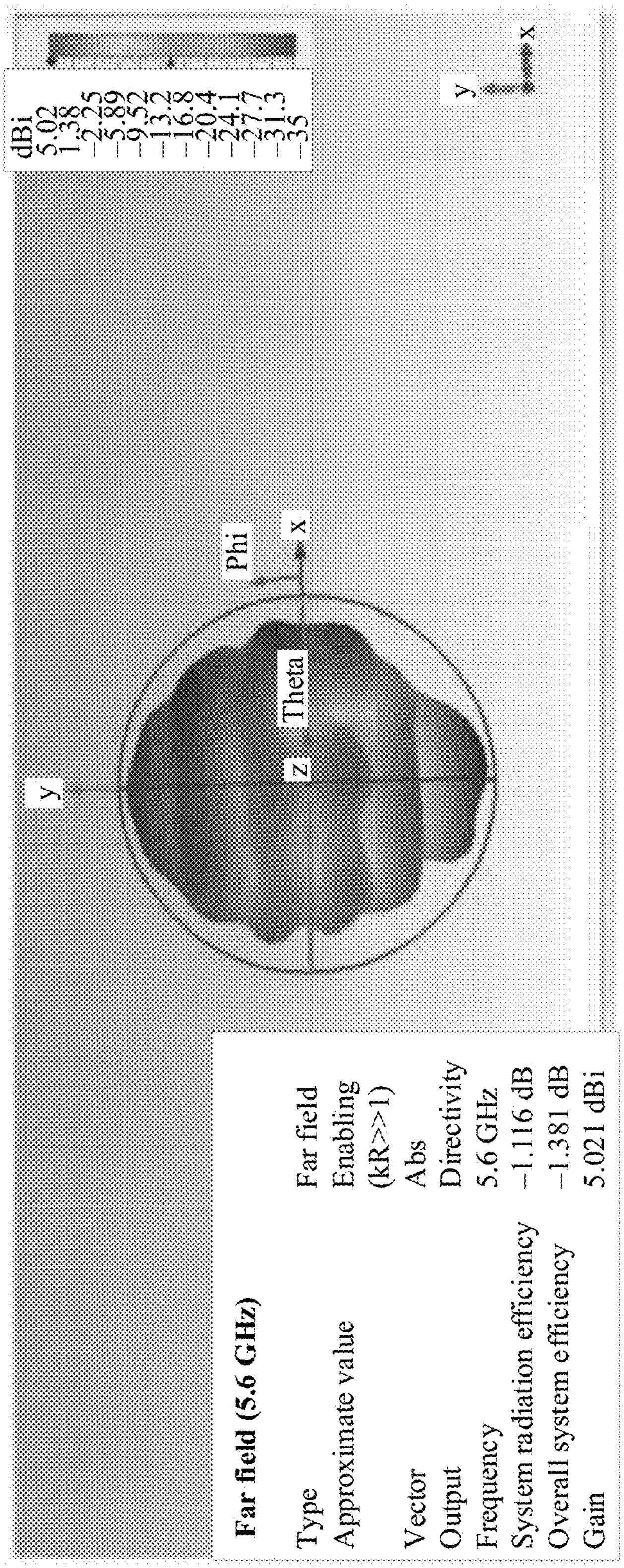
FIG. 14A and FIG. 14B are an example of a comparison diagram of antenna directivity patterns before and after a parasitic radiation stub is added according to an embodiment of this application.
Figure 14B:
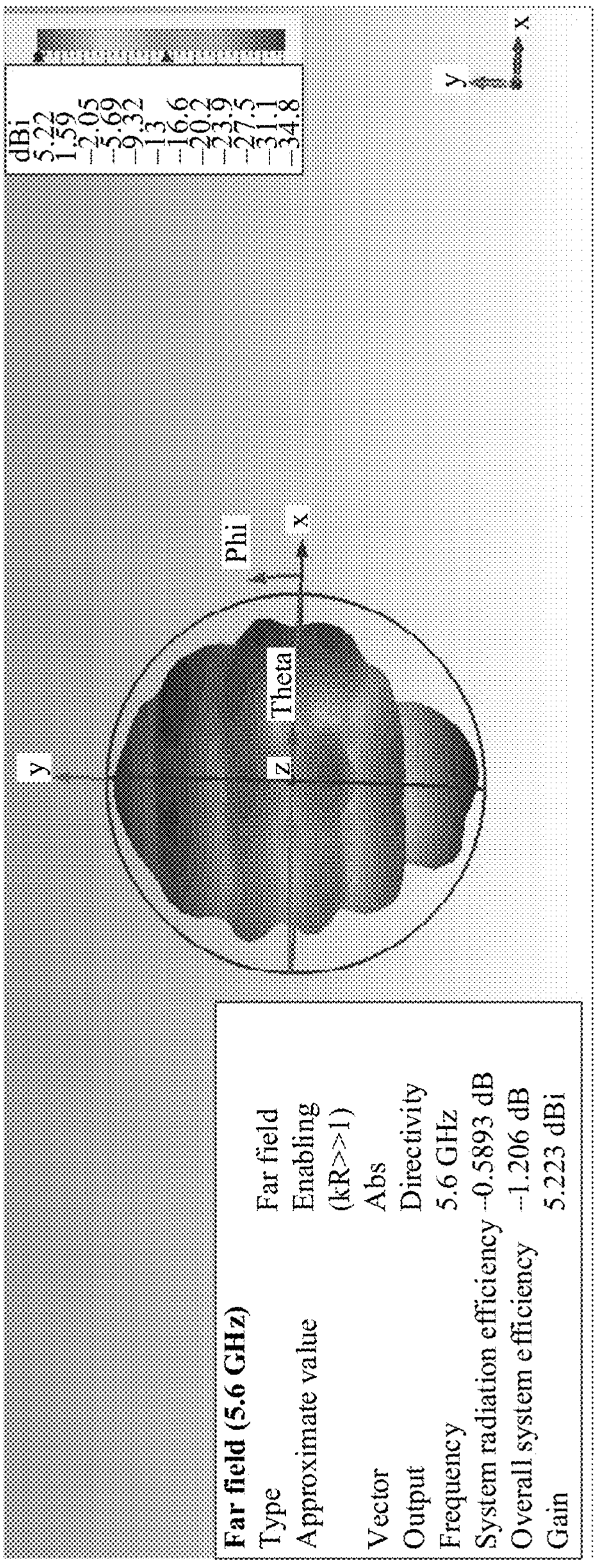

In FIG. 13A and FIG. 13B, FIG. 13A is an S-parameter curve diagram with only a single first radiation stub 201, and FIG. 13B is an S-parameter curve diagram with a first radiation stub 201 and a second radiation stub 202. It can be clearly learned that after the second radiation stub 202 is added as the parasitic radiation stub, there are two resonant states at Port 1 instead of one resonant state, and an operating bandwidth becomes wider. FIG. 14A is an antenna directivity pattern with only a single first radiation stub 201, and FIG. 14B is an antenna directivity pattern with a first radiation stub 201 and a second radiation stub 202. It can be learned that after the second radiation stub 202 is added as the parasitic radiation stub, the directivity pattern does not deteriorate.

Figure 15A:
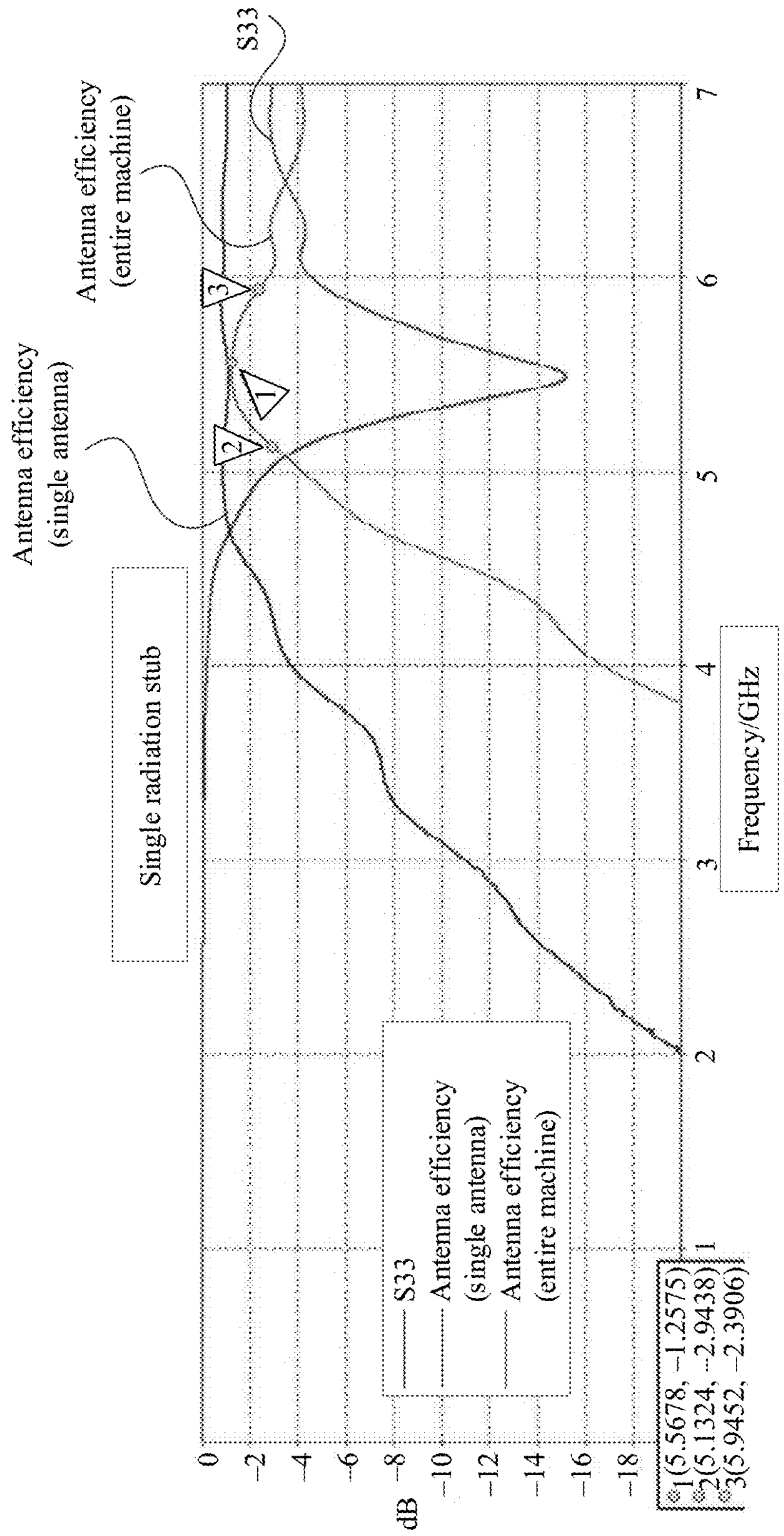
FIG. 15A and FIG. 15B are an example of a comparison diagram of antenna efficiency curves before and after a parasitic radiation stub is added according to an embodiment of this application.
Figure 15B:
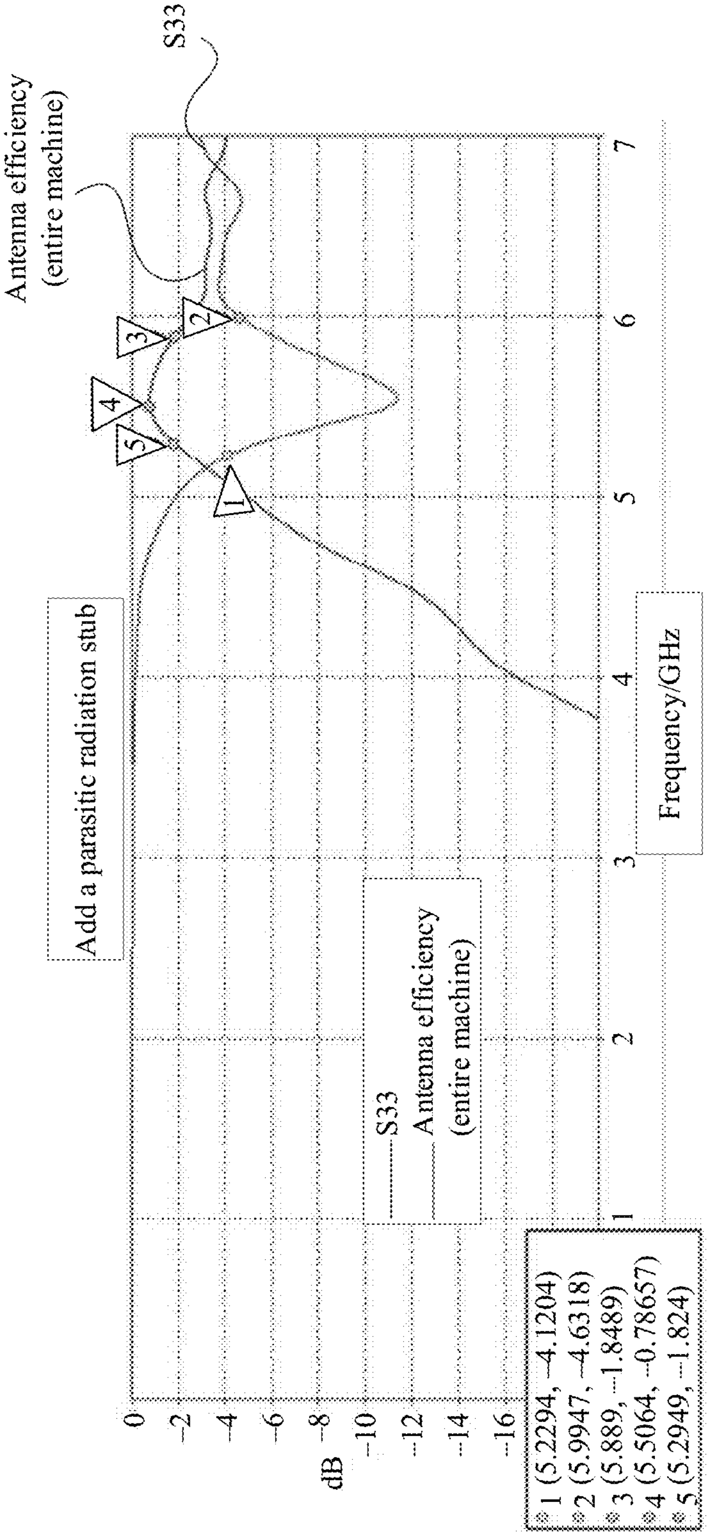
Figure 16A:
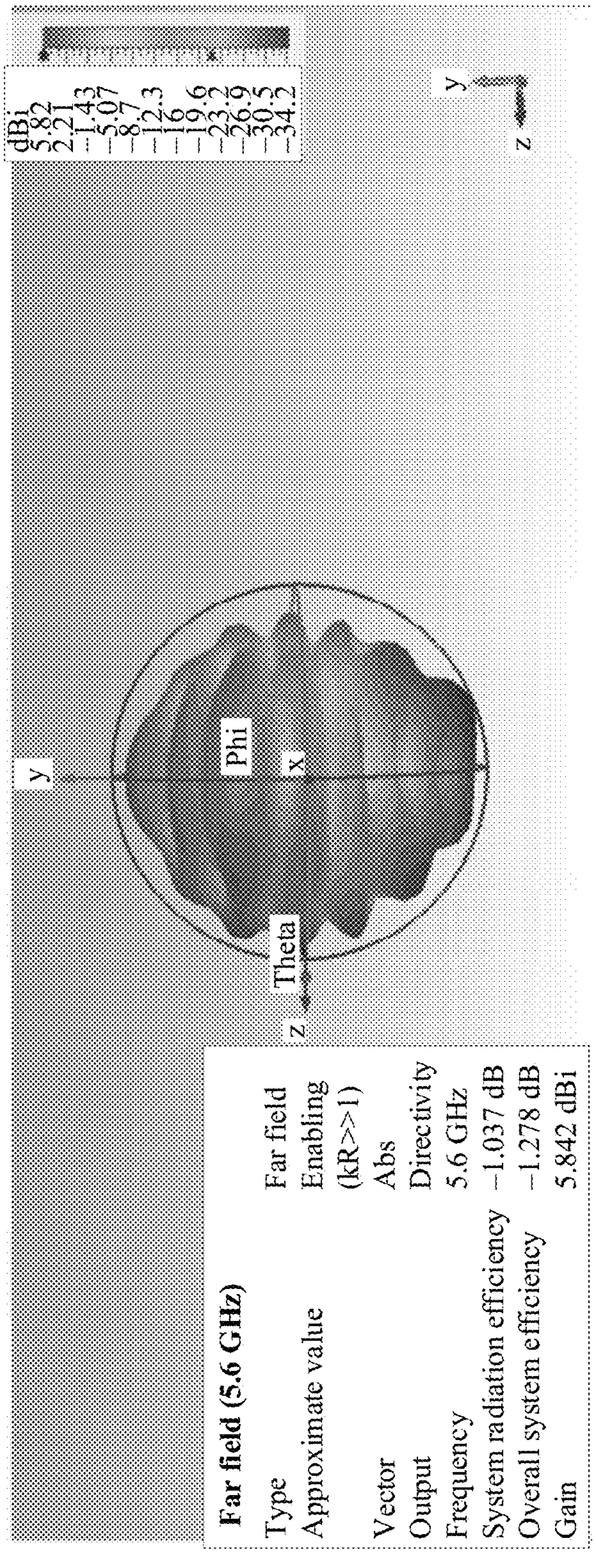
FIG. 16A and FIG. 16B are an example of a comparison diagram of antenna directivity patterns before and after a parasitic radiation stub is added according to an embodiment of this application.
Figure 16B:
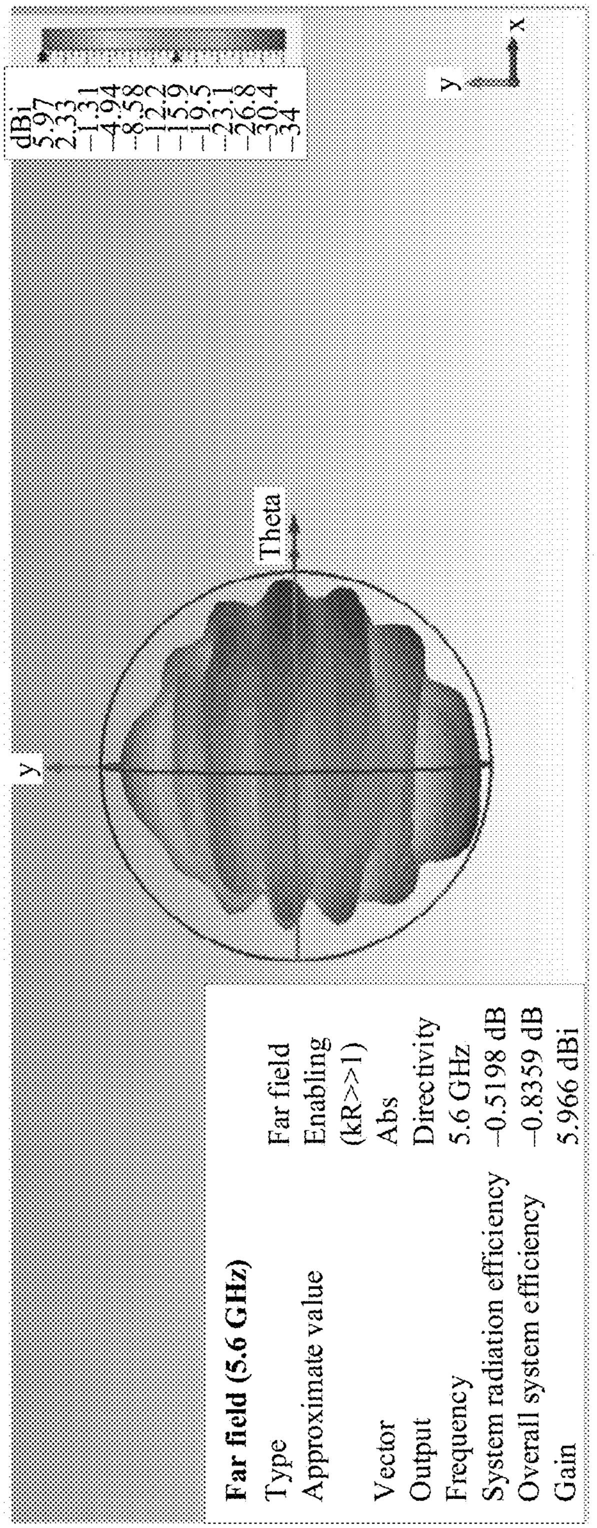

As shown in FIG. 15A and FIG. 15B, FIG. 15A is an antenna efficiency curve diagram with only a single third radiation stub 203. FIG. 15B is an antenna efficiency curve diagram with a third radiation stub 203 and a second radiation stub 202. It can be learned that efficiency at a mark point 1 in FIG. 15A is −1.2575, and efficiency at a mark point 4 in FIG. 15B is −0.78657, which improves approximately 0.5 dB. It can be learned from FIG. 15A and FIG. 15B that after the second radiation stub 202 is added, the antenna efficiency within a passband (within 5.1 GHz to 5.8 GHZ) is improved. FIG. 16A is an antenna directivity pattern with only a single third radiation stub 203, and FIG. 16B is an antenna directivity pattern with a third radiation stub 203 and a second radiation stub 202. It can be learned that after the parasitic second radiation stub 202 is added, the directivity pattern does not deteriorate.

Figure 17A:
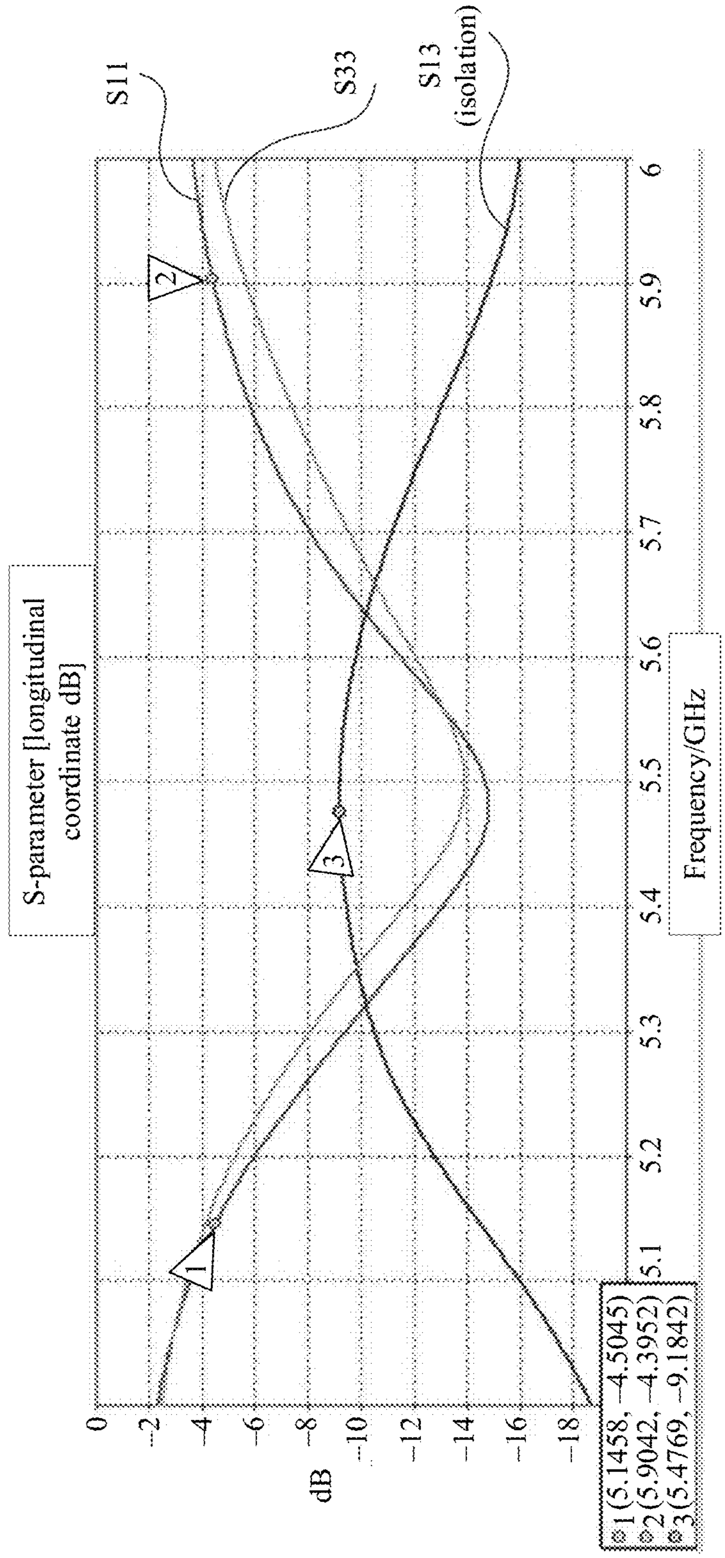
FIG. 17A and FIG. 17B are an example of a comparison diagram of isolation before and after a parasitic radiation stub is added according to an embodiment of this application.
Figure 17B:
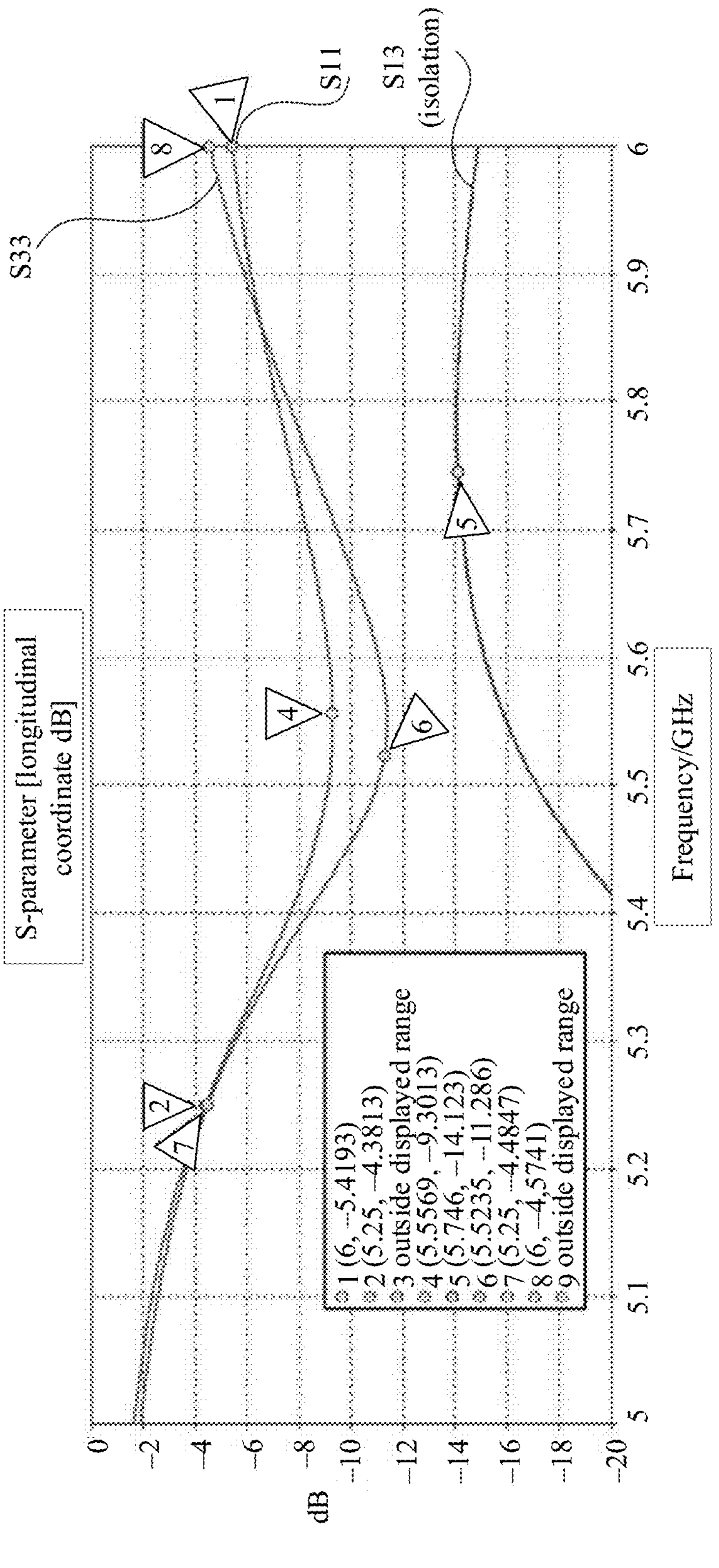

FIG. 17A is a curve diagram of isolation between Por1 and Port3 when the second radiation stub 202 is not added. A peak value is a mark point 3, and isolation at the mark point 3 is about −9 dB. FIG. 17B is a curve diagram of isolation between Por1 and Port3 when the second radiation stub 202 is added. A peak value is a mark point 5, and isolation at the mark point 5 is below −14 dB. It can be learned that after the second radiation stub 202 is added, a peak value of the isolation is optimized by about 5 dB, and isolation at another frequency is also significantly improved.

Figure 18A:
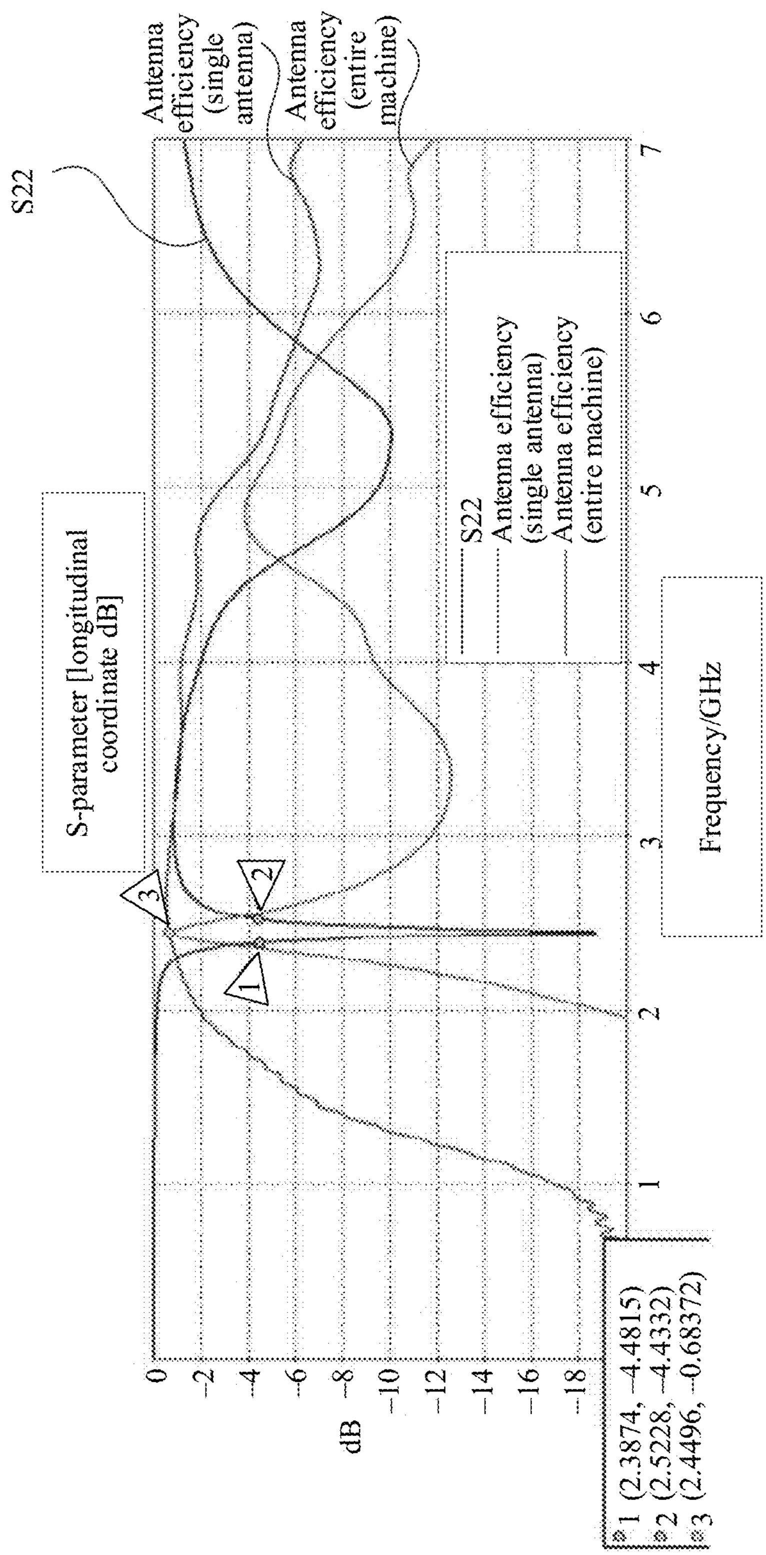
FIG. 18A and FIG. 18B are an S-parameter curve, an antenna efficiency curve, and an antenna directivity pattern of a single radiation stub at a frequency of 2.4 GHz according to an embodiment of this application.
Figure 18B:
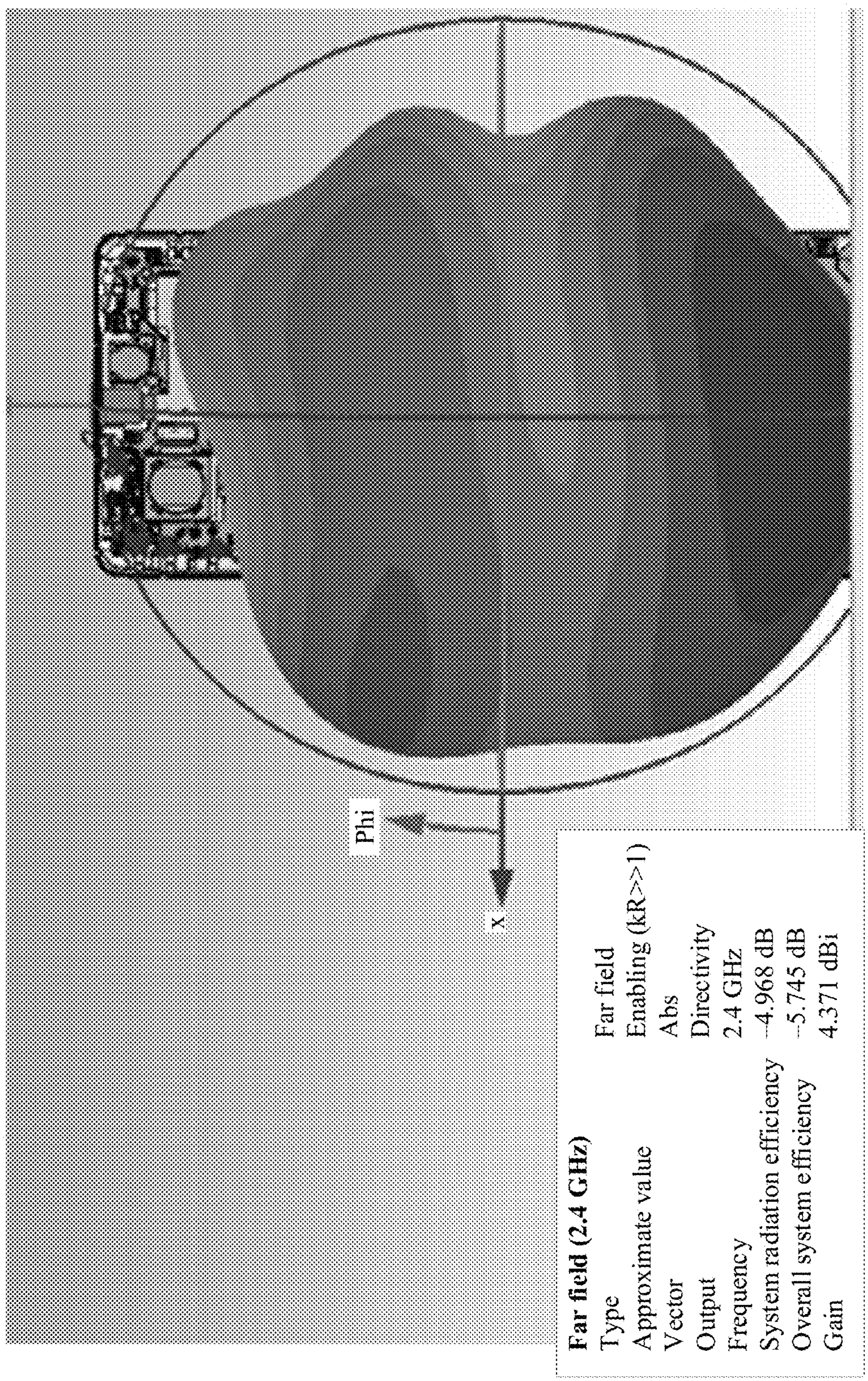

In the foregoing embodiments, the S-parameter curve diagram of the second radiation stub 202 may also refer to FIG. 18A. A reflection coefficient S22 of a frequency between a mark point 1 (2.38 GHz) and a mark point 2 (2.52 GHz) is less than −4.4 dB. At a mark point 3 (2.449 GHZ), antenna efficiency (antenna efficiency of a single antenna and antenna efficiency of an entire machine) reaches −0.68, which meets a use requirement of the antenna. In this case, when a signal of a frequency 2.52 GHz corresponding to the mark point 3 is excited, the current distribution diagram may refer to FIG. 8. FIG. 18B is an antenna directivity pattern of the second radiation stub 202 corresponding to the mark point 3. In this case, the antenna directivity pattern is relatively circular and a gain is relatively uniform, which can meet the use requirement.

Figure 19:
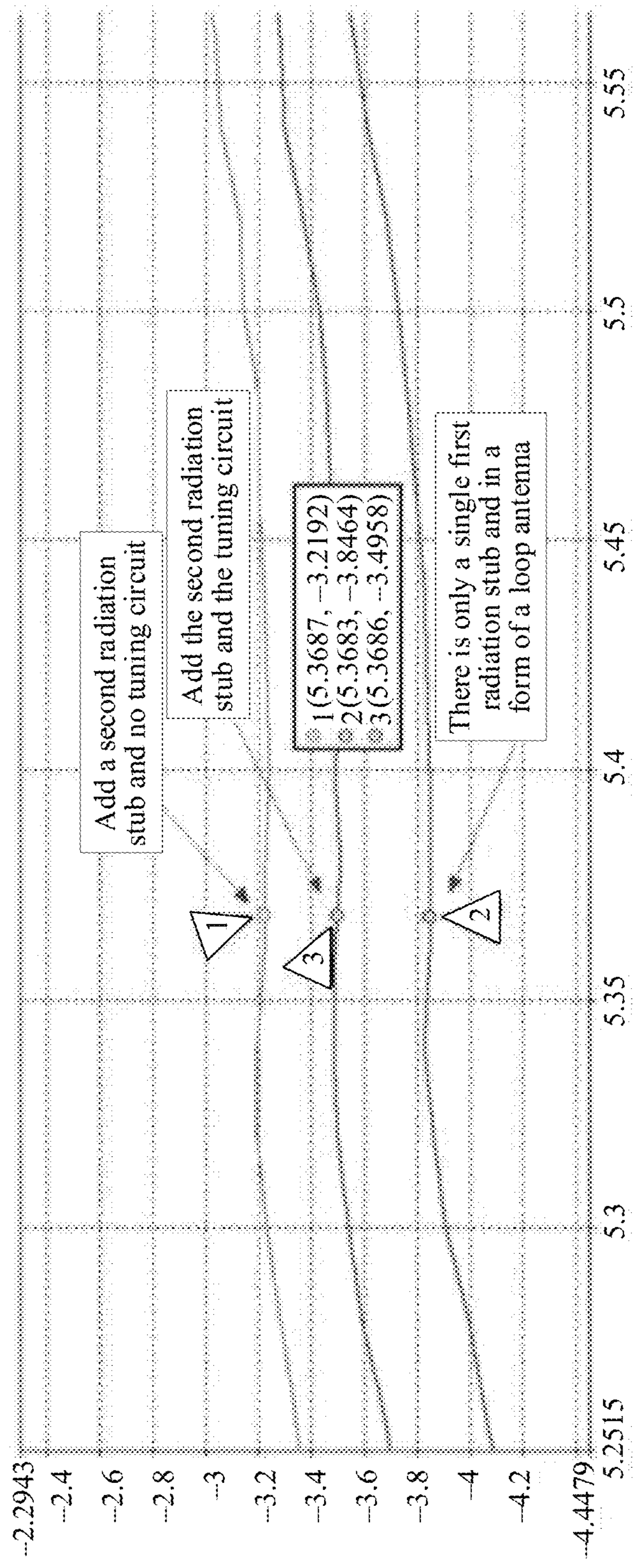
FIG. 19 is a comparison diagram of antenna efficiency curves of antennas of different structures according to an embodiment of this application.

Next, contributions of the second radiation stub 202 and the tuning circuit 501 to the antenna efficiency are compared and explained. As shown in an antenna efficiency curve diagram shown in FIG. 19, when the first radiation stub 201 is single and in a form of a loop antenna, the antenna efficiency at 5.368 GHz is about −3.84; when the second radiation stub 202 is added and the tuning circuit 501 is not added, the antenna efficiency at 5.368 GHz is about −3.49; and when the second radiation stub 202 is added and the tuning circuit 501 is added and the second radiation stub 202 is fed, the antenna efficiency at 5.368 GHz is about −3.2. It can be learned that the second radiation stub 202 and the tuning circuit 501 improve the antenna efficiency to a certain extent.

In some embodiments, the first radiation stub 201 is in a form of a loop antenna, the second radiation stub 202 is in a form of an IFA antenna, and the third radiation stub 203 is in a form of a loop antenna. For details, reference may be made to structures shown in FIG. 2, FIG. 4, FIG. 5, and FIG. 11.

Figure 20:
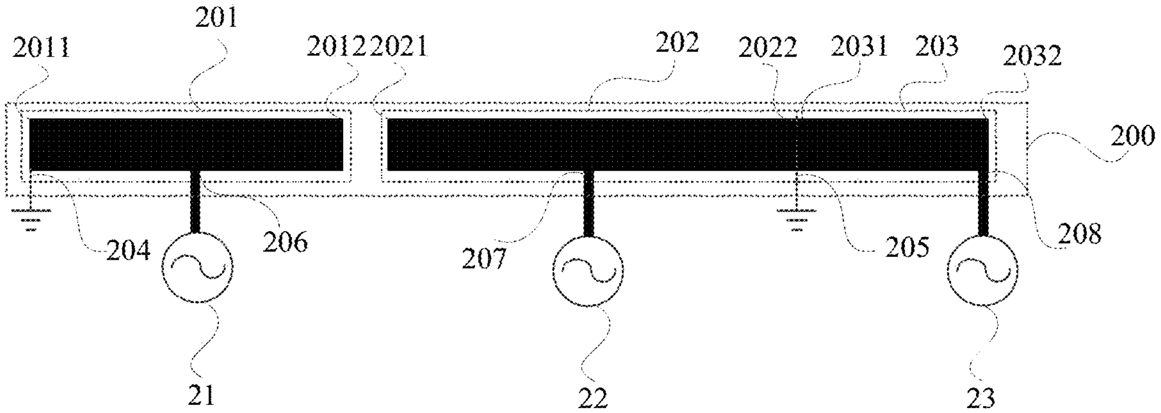
FIG. 20 is another example of a schematic structural diagram of a self-decoupling wideband antenna system according to an embodiment of this application.

In some embodiments, the first radiation stub 201 is in a form of an IFA antenna, the second radiation stub 202 is in a form of an IFA antenna, and the third radiation stub 203 is in a form of a loop antenna. For details, reference may be made to FIG. 20. The first feed point 206 is no longer located at the second end 2012 of the first radiation stub 201, but moves toward the first ground point 204 by a specific distance, so that the first radiation stub 201 is in the form of the IFA antenna.

In some embodiments, the antenna system is an MDA system. An antenna system in a form of the MDA facilitates integration of the antenna system and an entire machine structure, thereby reducing difficulty of mounting and maintenance. In some embodiments, the antenna system is a frame antenna system. An antenna system in a form of the frame antenna is exposed outside the terminal device, which can avoid signal shielding caused by structures such as a housing and improve performance of the antenna.

An embodiment of this application further provides a terminal device, including the antenna system in any one of the foregoing embodiments. In the terminal device, a specific form of the antenna system and generated beneficial effects may be found in the related descriptions in the antenna system embodiments, and details are not described herein again.

Figure 21A:
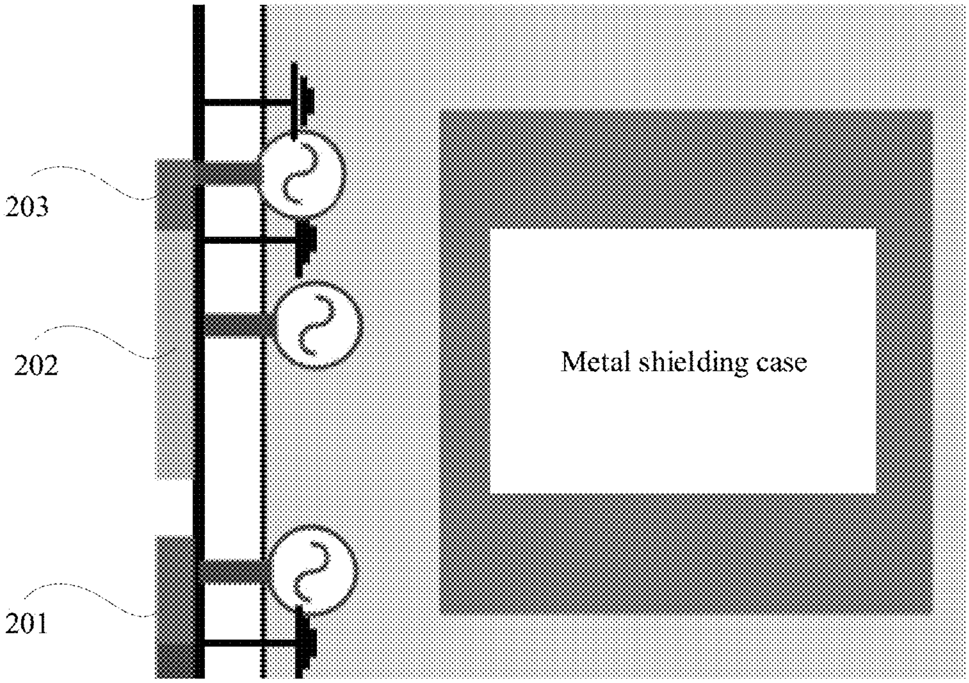
FIG. 21A and FIG. 21B are another example of a schematic diagram of a position of a self-decoupling wideband antenna system in a terminal device according to an embodiment of this application.
Figure 21B:
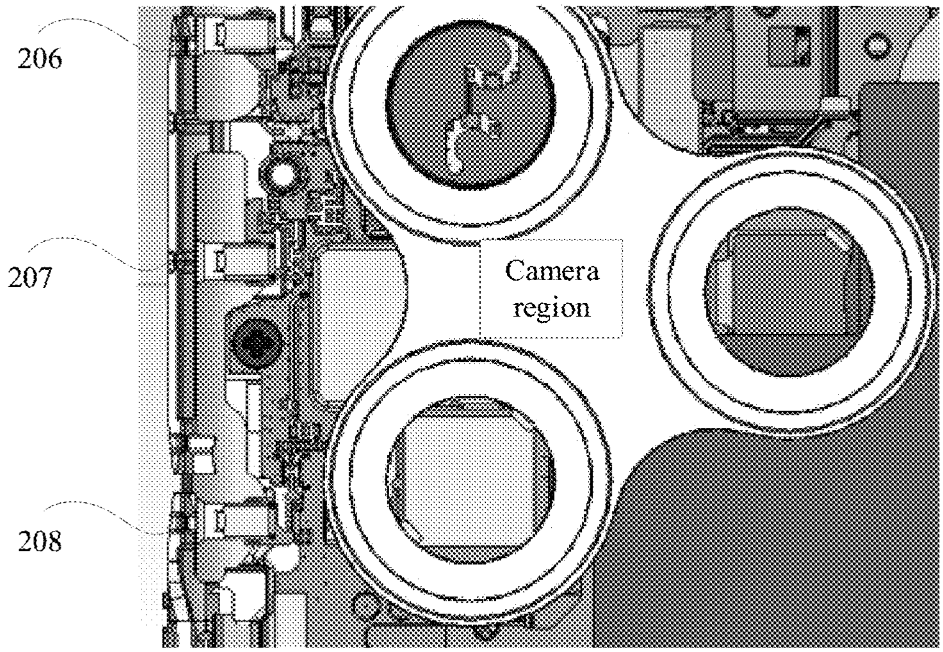

A relative position of the foregoing antenna system in the terminal device may also be shown in FIG. 21A and FIG. 21B. In FIG. 21A, the antenna system is located on a side edge of the terminal device. FIG. 21A is a schematic diagram of a relative position of an antenna system in an entire terminal device and a metal shielding case. In FIG. 21B, the antenna system is located on a side edge of the terminal device. FIG. 21B is a schematic diagram of a relative position of an antenna system in an entire terminal device and a camera. A port 1 is Port1, a port 2 is Port2, and a port 3 is Port3.

Optionally; the antenna system may be arranged on a short side of the terminal device, for example, at a position shown in FIG. a figure a in FIG. 1, arranging the antenna system on the short side prevents antenna efficiency from drastically decreasing due to hand holding when a user holds the terminal device during a call, ensuring communication quality when the user has a call.

Optionally, the foregoing antenna system may be arranged on a long side of the terminal device, for example, at a position shown in a figure b in FIG. 1, arranging the antenna system on the long side prevents antenna efficiency from drastically decreasing due to hand holding when a user watches videos or plays games horizontally, ensuring communication quality when the user holds the device horizontally.

The above describes in detail the examples of the antenna system provided in this application. It can be understood that, to implement the foregoing functions, the corresponding terminal device includes a corresponding hardware for executing the functions.

In the several embodiments provided in this application, it should be understood that the disclosed structure may be implemented in other manners. For example, the described structural embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna system, comprising:

a first feed point;

a first radiation stub having a first end that is connected to a first ground point, wherein the first radiation stub is further connected to the first feed point;

a second feed point;

a second radiation stub having a first end that is connected to a second ground point, wherein a slot is provided between a second end of the second radiation stub and a second end of the first radiation stub, wherein a distance between the second end of the second radiation stub and the second end of the first radiation stub is less than a distance between the first end of the second radiation stub and the second end of the first radiation stub, and wherein the second radiation stub is further connected to the second feed point;

a third feed point; and a third radiation stub having a first end that is connected to the second ground point, and a second end away from the second ground point that is connected to the third feed point.

2. The antenna system of claim 1, wherein the second radiation stub is configured to act as a parasitic radiation stub, and wherein the antenna system further comprises:

a first antenna that comprises the first radiation stub, the parasitic second radiation stub, and the first feed point;

a second antenna that comprises the second radiation stub and the second feed point; and a third antenna that comprises the third radiation stub, the parasitic second radiation stub, and the third feed point.

3. The antenna system of claim 2, wherein an operating frequency band of the first antenna is the same as an operating frequency band of the third antenna, and the operating frequency band of the first antenna is different from an operating frequency band of the second antenna.

4. The antenna system of claim 1, wherein the first radiation stub and the second radiation stub are configured to excite a first resonant mode under an action of a first frequency band signal fed at the first feed point, and the first resonant mode is a resonant mode corresponding to a slot common mode current, wherein the first radiation stub and the second radiation stub are further configured to excite a second resonant mode under an action of a second frequency band signal fed at the first feed point, and the second resonant mode is a resonant mode corresponding to a slot differential mode current, wherein the second radiation stub is configured to excite a third resonant mode under an action of a third frequency band signal fed at the second feed point, wherein the second radiation stub and the third radiation stub are configured to excite a fourth resonant mode under an action of the first frequency band signal fed at the third feed point, and the fourth resonant mode is a resonant mode corresponding to a line common mode current, and wherein the second radiation stub and the third radiation stub are further configured to excite a fifth resonant mode under an action of the second frequency band signal fed at the third feed point, and the fifth resonant mode is a resonant mode corresponding to a line differential mode current.

5. The antenna system of claim 4, wherein the first frequency band signal, the second frequency band signal, and the third frequency band signal are Wi-Fi signals.

6. The antenna system of claim 1, further comprising a tuning circuit, wherein one end of the tuning circuit is connected to the second feed point on the second radiation stub, and another end of the tuning circuit is grounded.

7. The antenna system of claim 6, wherein the tuning circuit is an inductor-capacitor (LC) filtering circuit.

8. The antenna system of claim 6, wherein the first radiation stub is in a form of a loop antenna or an inverted F antenna, the second radiation stub is in a form of an inverted F antenna, and the third radiation stub is in a form of a loop antenna.

9. The antenna system of claim 1, wherein the antenna system is a mode decoration antenna (MDA) system or a frame antenna system.

10. An antenna system, comprising:

a first feed point;

a first radiation stub having a first end that is connected to a first ground point, wherein the first radiation stub is further connected to the first feed point;

a second feed point;

a second radiation stub having a first end that is connected to a second ground point, wherein a slot is provided between a second end of the second radiation stub and a second end of the first radiation stub, wherein a distance between the second end of the second radiation stub and the second end of the first radiation stub is less than a distance between the first end of the second radiation stub and the second end of the first radiation stub, wherein the second radiation stub is further connected to the second feed point, wherein the first radiation stub and the second radiation stub are configured to excite a first resonant mode under an action of a first frequency band signal fed at the first feed point, and the first resonant mode is a resonant mode corresponding to a slot common mode current, wherein the first radiation stub and the second radiation stub are further configured to excite a second resonant mode under an action of a second frequency band signal fed at the first feed point, and the second resonant mode is a resonant mode corresponding to a slot differential mode current, and wherein the second radiation stub is configured to excite a third resonant mode under an action of a third frequency band signal fed at the second feed point;

a third feed point; and a third radiation stub having a first end that is connected to the second ground point, and a second end away from the second ground point that is connected to the third feed point, wherein the second radiation stub and the third radiation stub are configured to excite a fourth resonant mode under an action of the first frequency band signal fed at the third feed point, and the fourth resonant mode is a resonant mode corresponding to a line common mode current, and wherein the second radiation stub and the third radiation stub are further configured to excite a fifth resonant mode under an action of the second frequency band signal fed at the third feed point, and the fifth resonant mode is a resonant mode corresponding to a line differential mode current.

11. The antenna system of claim 10, wherein the second radiation stub is configured to act as a parasitic radiation stub, and wherein the antenna system further comprises:

a first antenna that comprises the first radiation stub, the parasitic second radiation stub, and the first feed point;

a second antenna that comprises the second radiation stub and the second feed point; and a third antenna that comprises the third radiation stub, the parasitic second radiation stub, and the third feed point.

12. The antenna system of claim 11, wherein an operating frequency band of the first antenna is the same as an operating frequency band of the third antenna, and the operating frequency band of the first antenna is different from an operating frequency band of the second antenna.

13. The antenna system of claim 10 further comprising a tuning circuit, wherein one end of the tuning circuit is connected to the second feed point on the second radiation stub, and another end of the tuning circuit is grounded.

14. The antenna system of claim 13, wherein the tuning circuit is an inductor-capacitor (LC) filtering circuit.

15. The antenna system of claim 13, wherein the first radiation stub is in a form of a loop antenna or an inverted F antenna, the second radiation stub is in a form of an inverted F antenna, and the third radiation stub is in a form of a loop antenna.

16. The antenna system of claim 10, wherein the antenna system is a mode decoration antenna (MDA) system or a frame antenna system.

17. The antenna system of claim 10, wherein the first frequency band signal, the second frequency band signal, and the third frequency band signal are Wi-Fi signals.

18. A terminal device, comprising:

a housing; and an antenna system arranged within the housing, wherein the antenna system comprises:

a first feed point;

a first radiation stub having a first end that is connected to a first ground point, wherein the first radiation stub is further connected to the first feed point;

a second feed point;

a second radiation stub having a first end that is connected to a second ground point, wherein a slot is provided between a second end of the second radiation stub and a second end of the first radiation stub, wherein a distance between the second end of the second radiation stub and the second end of the first radiation stub is less than a distance between the first end of the second radiation stub and the second end of the first radiation stub, wherein the second radiation stub is further connected to the second feed point, wherein the first radiation stub and the second radiation stub are configured to excite a first resonant mode under an action of a first frequency band signal fed at the first feed point, and the first resonant mode is a resonant mode corresponding to a slot common mode current, wherein the first radiation stub and the second radiation stub are further configured to excite a second resonant mode under an action of a second frequency band signal fed at the first feed point, and the second resonant mode is a resonant mode corresponding to a slot differential mode current, and wherein the second radiation stub is configured to excite a third resonant mode under an action of a third frequency band signal fed at the second feed point;

a third feed point; and a third radiation stub having a first end that is connected to the second ground point, and a second end away from the second ground point that is connected to the third feed point, wherein the second radiation stub and the third radiation stub are configured to excite a fourth resonant mode under an action of the first frequency band signal fed at the third feed point, and the fourth resonant mode is a resonant mode corresponding to a line common mode current, and wherein the second radiation stub and the third radiation stub are further configured to excite a fifth resonant mode under an action of the second frequency band signal fed at the third feed point, and the fifth resonant mode is a resonant mode corresponding to a line differential mode current.

19. The terminal device of claim 18, wherein the antenna system is located on a long side or a short side of the housing.

20. The terminal device of claim 18, wherein the second radiation stub is configured to act as a parasitic radiation stub, and wherein the antenna system further comprises:

a first antenna that comprises the first radiation stub, the parasitic second radiation stub, and the first feed point;

a second antenna that comprises the second radiation stub and the second feed point; and a third antenna that comprises the third radiation stub, the parasitic second radiation stub, and the third feed point, wherein an operating frequency band of the first antenna is the same as an operating frequency band of the third antenna, and the operating frequency band of the first antenna is different from an operating frequency band of the second antenna.

* * * * *